US012695257B2

(12) United States Patent
Gabrielsson et al.

(10) Patent No.: US 12,695,257 B2
(45) Date of Patent: Jul. 28, 2026

(54) MECHANICAL CURRENT SELECTOR AND LOW POWER ADAPTER EXCLUSION KEY

(71) Applicant: AMPURE CHARGING SYSTEMS, INC., Monrovia, CA (US)

(72) Inventors: Peter Gabrielsson, Monrovia, CA (US); Herman Joseph Steinbuchel, IV, Pasadena, CA (US); Spencer Skelly, Monrovia, CA (US); Christopher Wall, Monrovia, CA (US)

(73) Assignee: AMPURE CHARGING SYSTEMS, INC., Monrovia, CA (US)

( * ) Notice: Subject to any disclaimer, the term of this patent is extended or adjusted under 35 U.S.C. 154(b) by 224 days.

(21) Appl. No.: 18/371,668

(22) Filed: Sep. 22, 2023

(65) Prior Publication Data

US 2024/0014613 A1     Jan. 11, 2024

Related U.S. Application Data

(63) Continuation-in-part of application No. 17/586,276, filed on Jan. 27, 2022, now Pat. No. 11,909,148.

(51) Int. Cl.
| | |
|---|---|
| *H01R 29/00* | (2006.01) |
| *B60L 53/16* | (2019.01) |
| *H01R 13/66* | (2006.01) |
| *H01R 24/30* | (2011.01) |
| *H01R 103/00* | (2006.01) |

(52) U.S. Cl.
CPC ......... *H01R 29/00* (2013.01); *H01R 13/6683* (2013.01); *H01R 24/30* (2013.01); *B60L 53/16* (2019.02); *H01R 2103/00* (2013.01)

(58) Field of Classification Search
CPC   H01R 27/00; H01R 13/6683; H01R 13/6453; H01R 29/00; H01R 24/30; H01R 2103/00; B60L 1/00; B60L 53/16
USPC .......................... 439/171–174, 38, 131, 502
See application file for complete search history.

(56) References Cited

U.S. PATENT DOCUMENTS

| | | | | |
|---|---|---|---|---|
| 2,097,257 | A | 10/1937 | Schank | |
| 2,417,928 | A | 3/1947 | Guernsey | |
| 2,450,657 | A | 10/1948 | Guernsey | |
| 2,930,019 | A * | 3/1960 | Hubbell | H01R 13/642 |
| | | | | 439/173 |
| 2,989,719 | A | 6/1961 | Aarlaht | |
| 4,386,333 | A * | 5/1983 | Dillan | H01F 29/00 |
| | | | | 439/43 |
| 4,900,270 | A | 2/1990 | Edwards et al. | |
| 5,295,845 | A * | 3/1994 | Changxing | H01R 27/02 |
| | | | | 439/171 |
| 5,613,863 | A * | 3/1997 | Klaus | H01R 31/06 |
| | | | | D13/110 |
| 6,328,584 | B1 | 12/2001 | Follett | |
| 8,876,541 | B1 * | 11/2014 | Wu | H01R 27/00 |
| | | | | 439/173 |
| 10,161,806 | B2 | 12/2018 | Lermann | |
| 11,909,148 | B2 * | 2/2024 | Steinbuchel, IV | B60L 1/00 |

(Continued)

*Primary Examiner* — Gary F Paumen
(74) *Attorney, Agent, or Firm* — Command IP LLP; Michael Zarrabian

(57)     ABSTRACT

Systems, devices, and methods including a cordset having a housing comprising: a rotatable neutral blade, where the rotatable neutral blade is rotatable between a first horizontal position, a second vertical position, and a third angled position; a first hot plug blade; a second hot plug blade; and a ground plug blade.

17 Claims, 23 Drawing Sheets

(56)          References Cited

U.S. PATENT DOCUMENTS

| | | | |
|---|---|---|---|
| 2004/0219823 A1 | 11/2004 | Greene et al. | |
| 2005/0250375 A1* | 11/2005 | Allison | H01R 31/06 |
| | | | 439/502 |
| 2015/0295348 A1 | 10/2015 | Konias et al. | |
| 2017/0125957 A1 | 5/2017 | Ejiri et al. | |
| 2019/0013766 A1 | 1/2019 | Stach | |
| 2020/0059035 A1 | 2/2020 | Denzinger | |

* cited by examiner

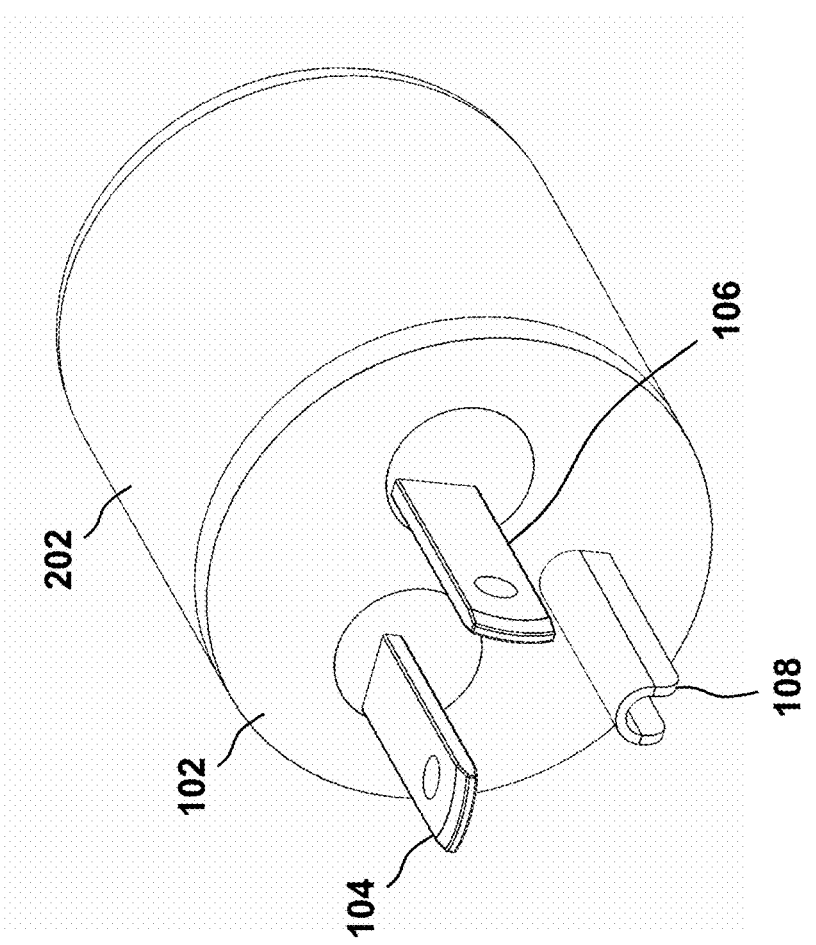
FIG. 2

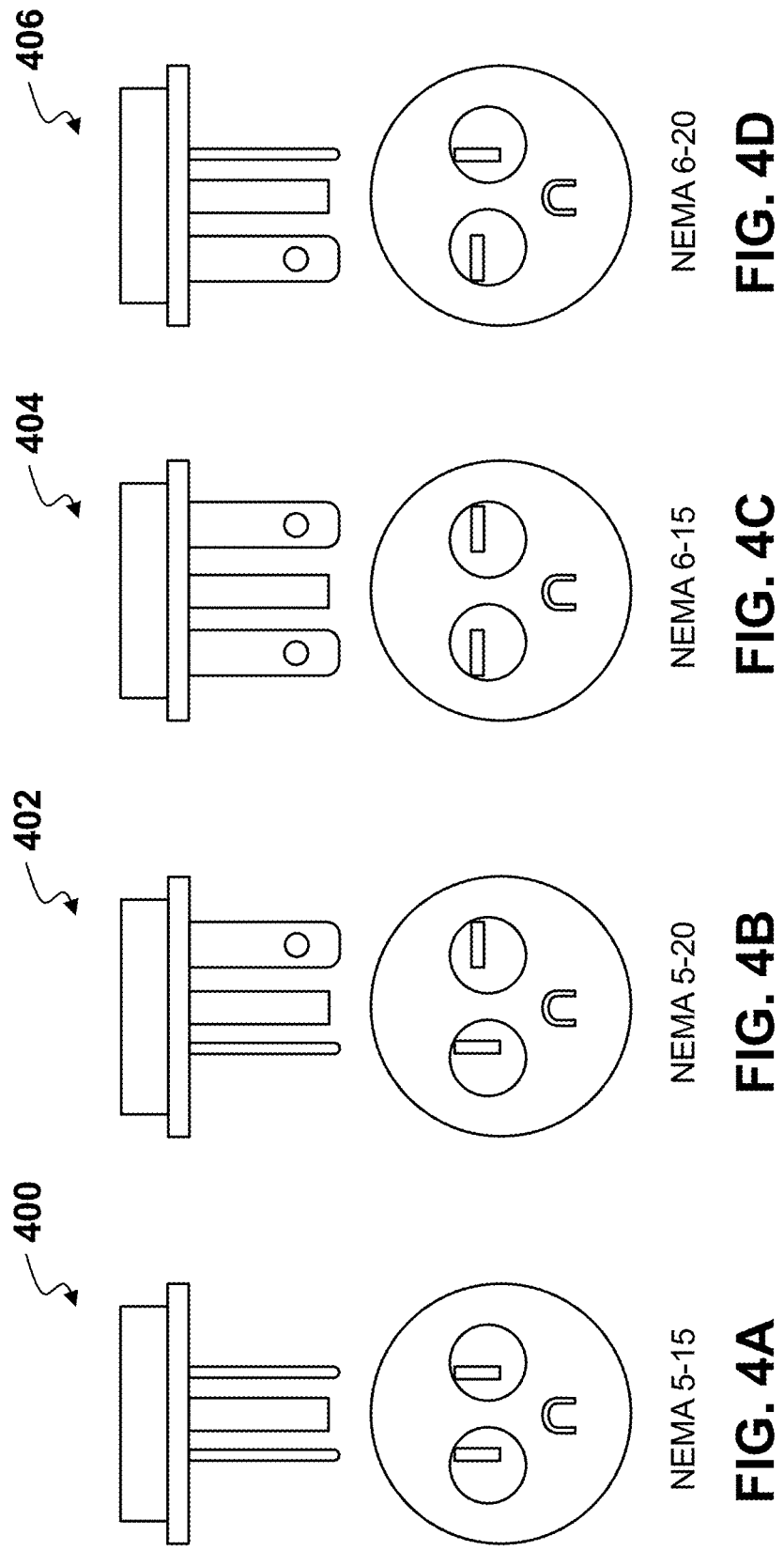
NEMA 5-15    FIG. 4A
NEMA 5-20    FIG. 4B
NEMA 6-15    FIG. 4C
NEMA 6-20    FIG. 4D

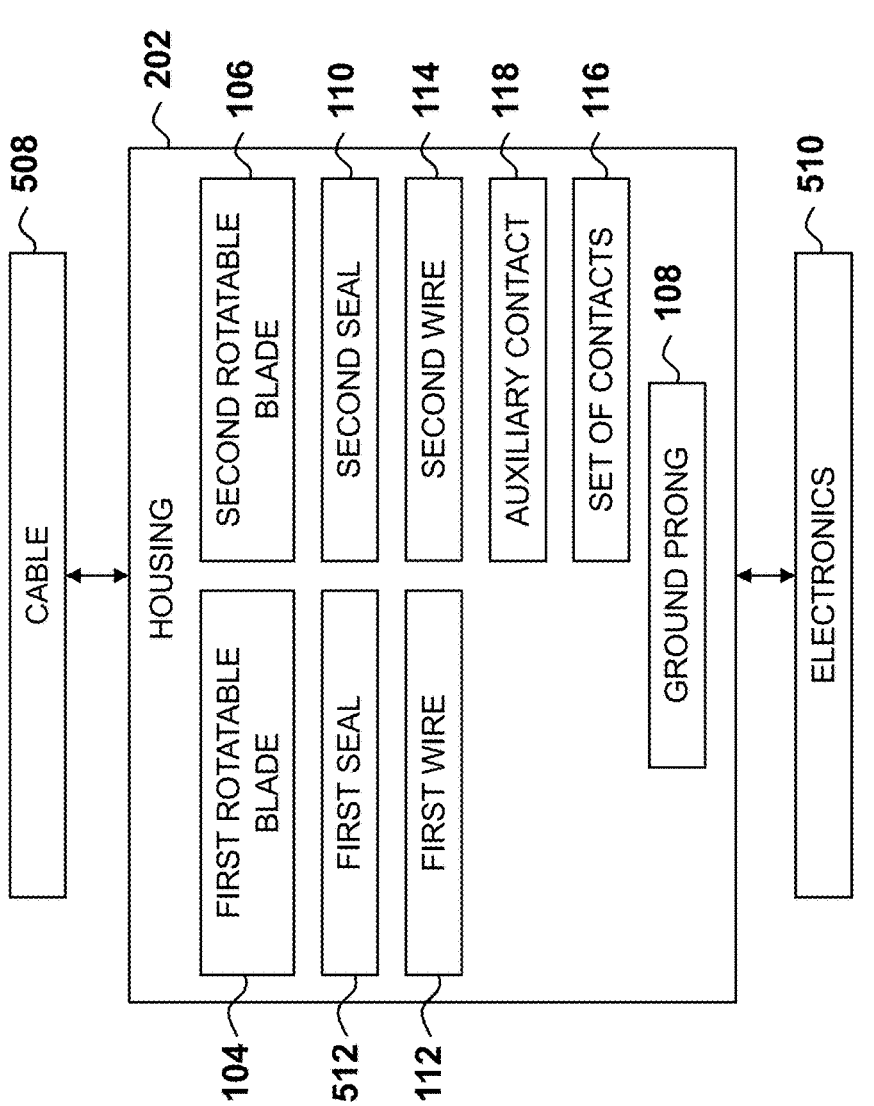
FIG. 5A

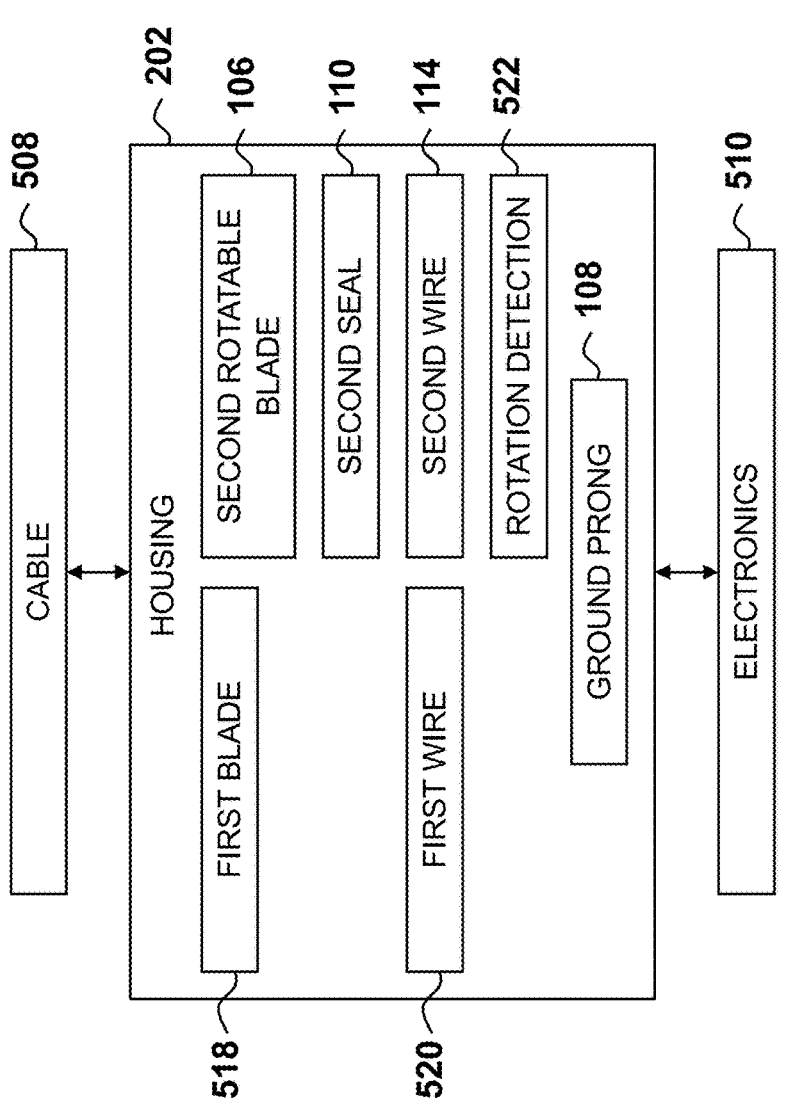
FIG. 5C

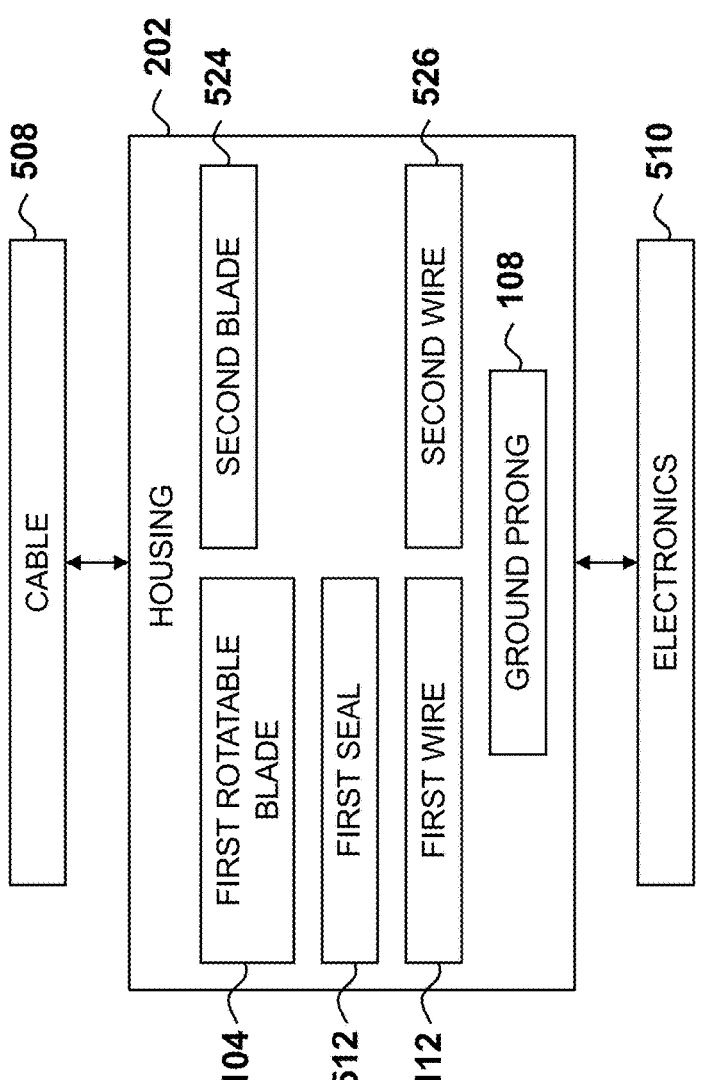
FIG. 5D

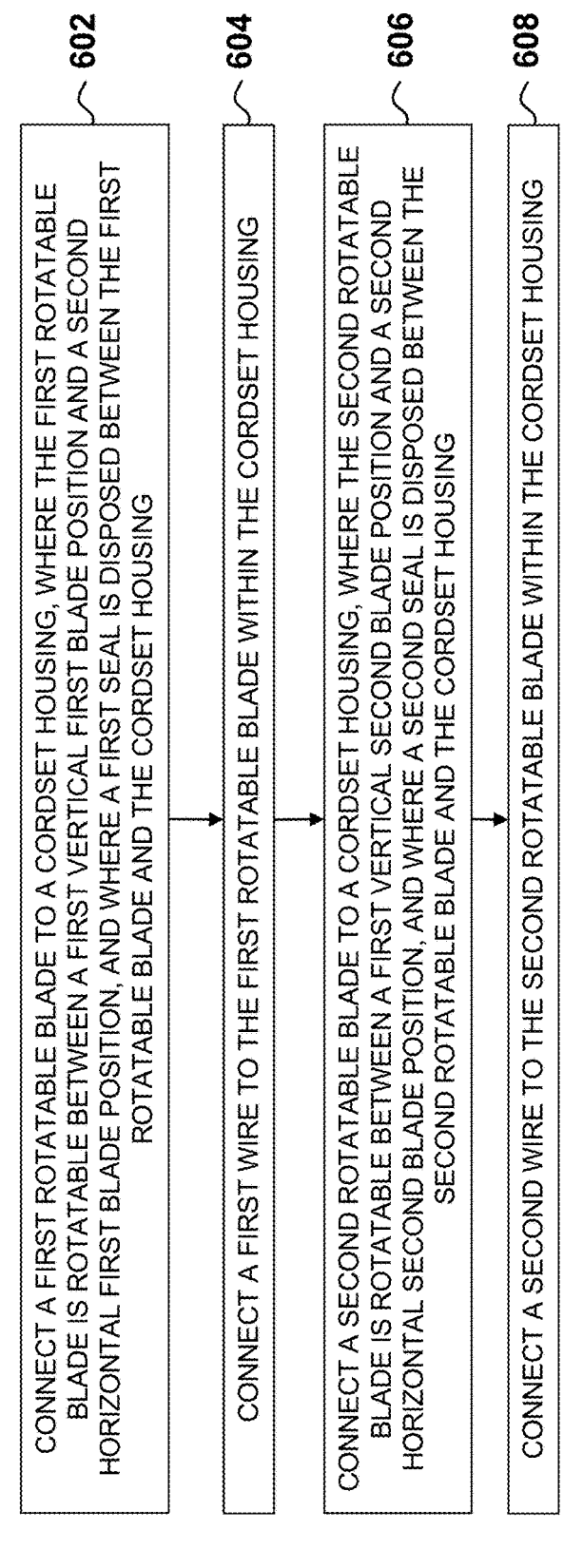

600

602

CONNECT A FIRST ROTATABLE BLADE TO A CORDSET HOUSING, WHERE THE FIRST ROTATABLE BLADE IS ROTATABLE BETWEEN A FIRST VERTICAL FIRST BLADE POSITION AND A SECOND HORIZONTAL FIRST BLADE POSITION, AND WHERE A FIRST SEAL IS DISPOSED BETWEEN THE FIRST ROTATABLE BLADE AND THE CORDSET HOUSING

604

CONNECT A FIRST WIRE TO THE FIRST ROTATABLE BLADE WITHIN THE CORDSET HOUSING

606

CONNECT A SECOND ROTATABLE BLADE TO A CORDSET HOUSING, WHERE THE SECOND ROTATABLE BLADE IS ROTATABLE BETWEEN A FIRST VERTICAL SECOND BLADE POSITION AND A SECOND HORIZONTAL SECOND BLADE POSITION, AND WHERE A SECOND SEAL IS DISPOSED BETWEEN THE SECOND ROTATABLE BLADE AND THE CORDSET HOUSING

608

CONNECT A SECOND WIRE TO THE SECOND ROTATABLE BLADE WITHIN THE CORDSET HOUSING

702
ROTATE A FIRST ROTATABLE BLADE BETWEEN A FIRST VERTICAL FIRST BLADE POSITION AND A SECOND HORIZONTAL FIRST BLADE POSITION

704
DETECT, VIA AN ELECTRONICS, A VOLTAGE BETWEEN THE FIRST ROTATABLE BLADE AND A SECOND BLADE

706
PROVIDE, VIA THE ELECTRONICS, AT LEAST ONE OF: A 15 AMP 120 VOLT CHARGE AND A 20 AMP 240 VOLT CHARGE

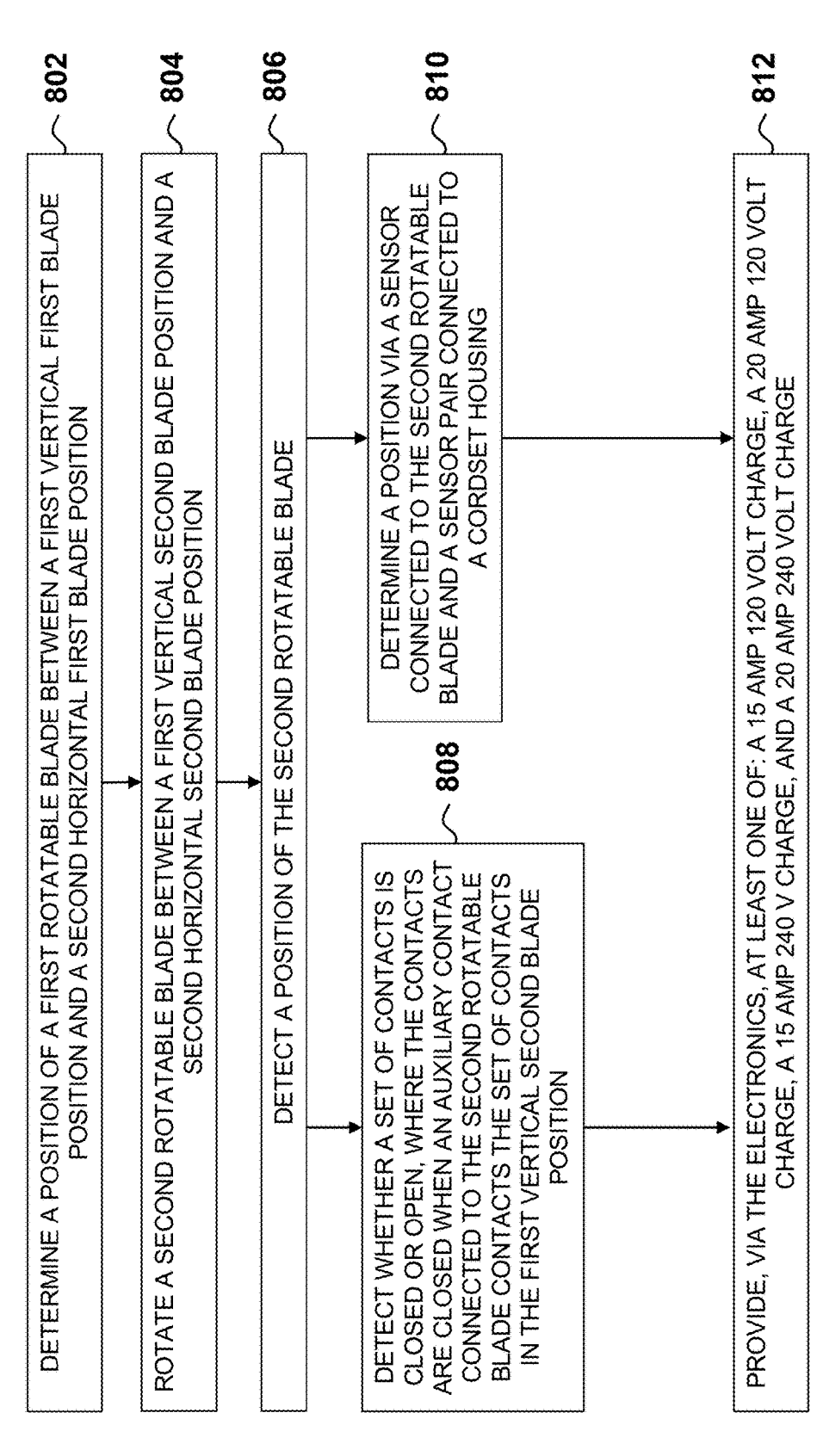

800

802

DETERMINE A POSITION OF A FIRST ROTATABLE BLADE BETWEEN A FIRST VERTICAL FIRST BLADE POSITION AND A SECOND HORIZONTAL FIRST BLADE POSITION

804

ROTATE A SECOND ROTATABLE BLADE BETWEEN A FIRST VERTICAL SECOND BLADE POSITION AND A SECOND HORIZONTAL SECOND BLADE POSITION

806

DETECT A POSITION OF THE SECOND ROTATABLE BLADE

808

DETECT WHETHER A SET OF CONTACTS IS CLOSED OR OPEN, WHERE THE CONTACTS ARE CLOSED WHEN AN AUXILIARY CONTACT CONNECTED TO THE SECOND ROTATABLE BLADE CONTACTS THE SET OF CONTACTS IN THE FIRST VERTICAL SECOND BLADE POSITION

810

DETERMINE A POSITION VIA A SENSOR CONNECTED TO THE SECOND ROTATABLE BLADE AND A SENSOR PAIR CONNECTED TO A CORDSET HOUSING

812

PROVIDE, VIA THE ELECTRONICS, AT LEAST ONE OF: A 15 AMP 120 VOLT CHARGE, A 20 AMP 120 VOLT CHARGE, A 15 AMP 240 V CHARGE, AND A 20 AMP 240 VOLT CHARGE

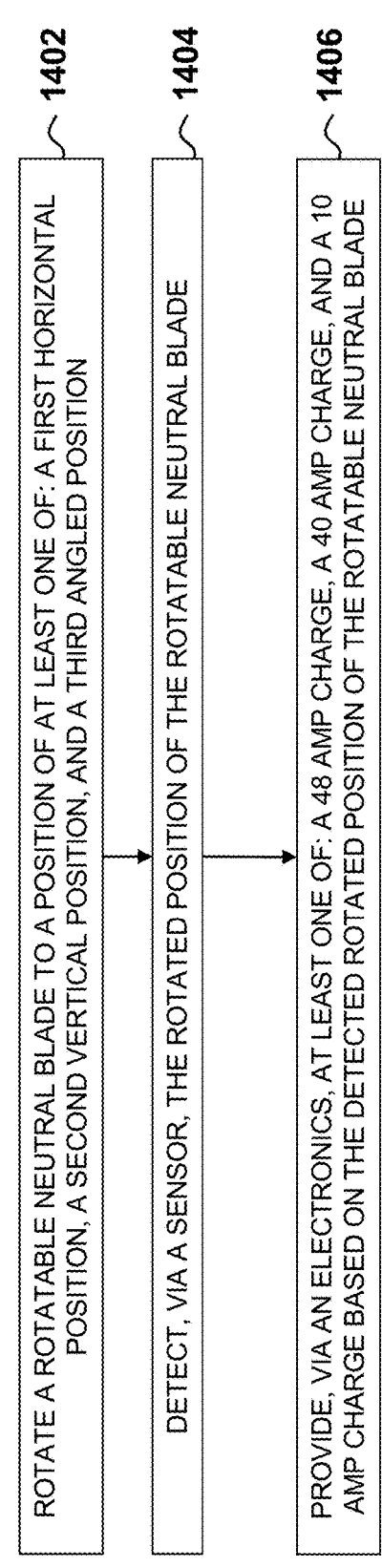

1402

ROTATE A ROTATABLE NEUTRAL BLADE TO A POSITION OF AT LEAST ONE OF: A FIRST HORIZONTAL POSITION, A SECOND VERTICAL POSITION, AND A THIRD ANGLED POSITION

1404

DETECT, VIA A SENSOR, THE ROTATED POSITION OF THE ROTATABLE NEUTRAL BLADE

1406

PROVIDE, VIA AN ELECTRONICS, AT LEAST ONE OF: A 48 AMP CHARGE, A 40 AMP CHARGE, AND A 10 AMP CHARGE BASED ON THE DETECTED ROTATED POSITION OF THE ROTATABLE NEUTRAL BLADE

FIG. 14

MECHANICAL CURRENT SELECTOR AND LOW POWER ADAPTER EXCLUSION KEY

CROSS-REFERENCE TO RELATED APPLICATION

This application is a continuation-in-part of U.S. Non-Provisional patent application Ser. No. 17/586,276, filed Jan. 27, 2022, the contents of which are hereby incorporated by reference herein for all purposes.

FIELD OF ENDEAVOR

The invention relates to electrical chargers, and more particularly to electric vehicle supply equipment (EVSE).

BACKGROUND

An electrical connector is an apparatus used to transfer electricity from a power supply to a utility device, such as an electrical vehicle (EV). Electrical connectors generally have an internal connection that electrically connects one end of an electrical connector to the other end of the electrical connector. Some electrical connectors may have the ability to receive varying amperages and voltages from a utility power source for charging with the use of one or more physical adapters.

SUMMARY

A system embodiment may include: a cordset comprising: a rotatable neutral blade, where the rotatable neutral blade may be rotatable between a first horizontal position, a second vertical position, and a third angled position; a first hot plug blade; a second hot plug blade; and a ground plug blade.

In additional system embodiments, the cordset further comprises: a sensor configured to sense an angle of the rotatable neutral blade as in at least one of: the first horizontal position, the second vertical position, and the third angled position. In additional system embodiments, the sensor may be a charge circuit interrupting device (CCID). In additional system embodiments, the CCID may be configured to set a max charge current such that a rating of an outlet may be not exceeded. In additional system embodiments, the sensor comprises at least one of: magnets, a potentiometer, switches, and encoders to sense the angle of the rotatable neutral blade.

In additional system embodiments, the rotatable neutral blade may be in the first horizontal position the rotatable neutral blade may be substantially perpendicular to the first hot plug blade and the second hot plug blade. In additional system embodiments, when the rotatable neutral blade may be in the first horizontal position the cordset may be configured to be used in NEMA 14-60 outlets, limited to 48 Amps. Additional system embodiments may further include: a first receptable, where the first receptable may be a NEMA 14-60 outlet, limited to 48 Amps, and where the cordset may be configured to be used with the first receptable when the rotatable neutral blade may be in in the first horizontal position.

In additional system embodiments, when the rotatable neutral blade may be in the second vertical position the rotatable neutral blade may be substantially parallel to the first hot plug blade and the second hot plug blade. In additional system embodiments, when the rotatable neutral blade may be in the second vertical position the cordset may be configured to be used in NEMA 14-50 outlets, limited to 40 Amps. Additional system embodiments may further include: a second receptable, where the second receptable may be a NEMA 14-50 outlet, limited to 40 Amps, and where the cordset may be configured to be used with the second receptable when the rotatable neutral blade may be in in the second vertical position.

In additional system embodiments, when the rotatable neutral blade may be in the third angled position the rotatable neutral blade may be at a forty-five degree angle relative to the first hot plug blade and the second hot plug blade. In additional system embodiments, when the rotatable neutral blade may be in the third angled position the cordset may be configured to be used with a low power adapter, limited to 10 Amps.

Additional system embodiments may further include: an adapter plug, where the adapter plug may be the low power adapter, limited to 10 Amps, and where the cordset may be configured to be used with the adapter plug when the rotatable neutral blade may be in in the third angled position.

A method embodiment may include: rotating a rotatable neutral blade to a position of at least one of: a first horizontal position, a second vertical position, and a third or more angled position; detecting, via a sensor, the rotated position of the rotatable neutral blade; and providing, via an electronics, at least one of: a 48 amp charge, a 40 amp charge, and a 10 amp charge based on the detected rotated position of the rotatable neutral blade.

In additional method embodiments, the rotatable neutral blade may be rotated to the first horizontal position when the electronics provides a charge limited to 48 Amps. In additional method embodiments, the rotatable neutral blade may be rotated to the second vertical position when the electronics provides a charge limited to 40 Amps. In additional method embodiments, the rotatable neutral blade may be rotated to the third angled position when the electronics provides a charge limited to 10 Amps.

An alternate system embodiment may include: a cordset comprising: a rotatable neutral blade, where the rotatable neutral blade may be rotatable between a first horizontal position, a second vertical position, and a third angled position; and an adapter plug, where the adapter plug comprises a neutral plug slot that may be angled in position relative to a first hot plug slot and a second hot plug slot, where the angled neutral plug slot acts as an exclusion key to prevent a user from plugging a non-approved device into the adapter plug; where the cordset may be configured to connect to the adapter plug when the rotatable neutral blade may be in the third angled position.

In additional system embodiments, the adapter plug further comprises: a three-prong plug connected to a four-prong receptacle by a cable, where the four-prong receptable comprises the angled neutral plug slot, and where the three-prong plug may be configured to connect to a 120 VAC outlet.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 2 depicts a front perspective view of a cordset EVSE with a housing, according to one embodiment;

FIG. 4A depicts top and front views of the cordset EVSE in a NEMA 5-15 configuration, according to one embodiment;

FIG. 4B depicts top and front views of the cordset EVSE in a NEMA 5-20 configuration, according to one embodiment;

FIG. 4C depicts top and front views of the cordset EVSE in a NEMA 6-15 configuration, according to one embodiment;

FIG. 4D depicts top and front views of the cordset EVSE in a NEMA 6-20 configuration, according to one embodiment;

FIG. 5A depicts an exemplary system for a cordset EVSE having two rotatable plug blades with an auxiliary contact to detect rotation of a second plug blade, according to one embodiment;

FIG. 5C depicts an exemplary system for a cordset EVSE having a fixed hot plug blade and a rotatable neutral plug blade, according to one embodiment;

FIG. 5D depicts an exemplary system for a cordset EVSE having a rotatable hot plug blade and a fixed neutral plug blade, according to one embodiment;

FIG. 6 depicts a flow chart of a method embodiment of assembling a cordset EVSE with rotatable plug blades, according to one embodiment;

FIG. 8 depicts a flow chart of a method embodiment of rotating a neutral plug blade of a cordset EVSE, according to one embodiment;

FIG. 14 depicts a flow chart of a method embodiment of rotating a neutral plug blade of a cordset EVSE, according to one embodiment;

DETAILED DESCRIPTION

The following description is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Figures 1A, 1B, 1C:
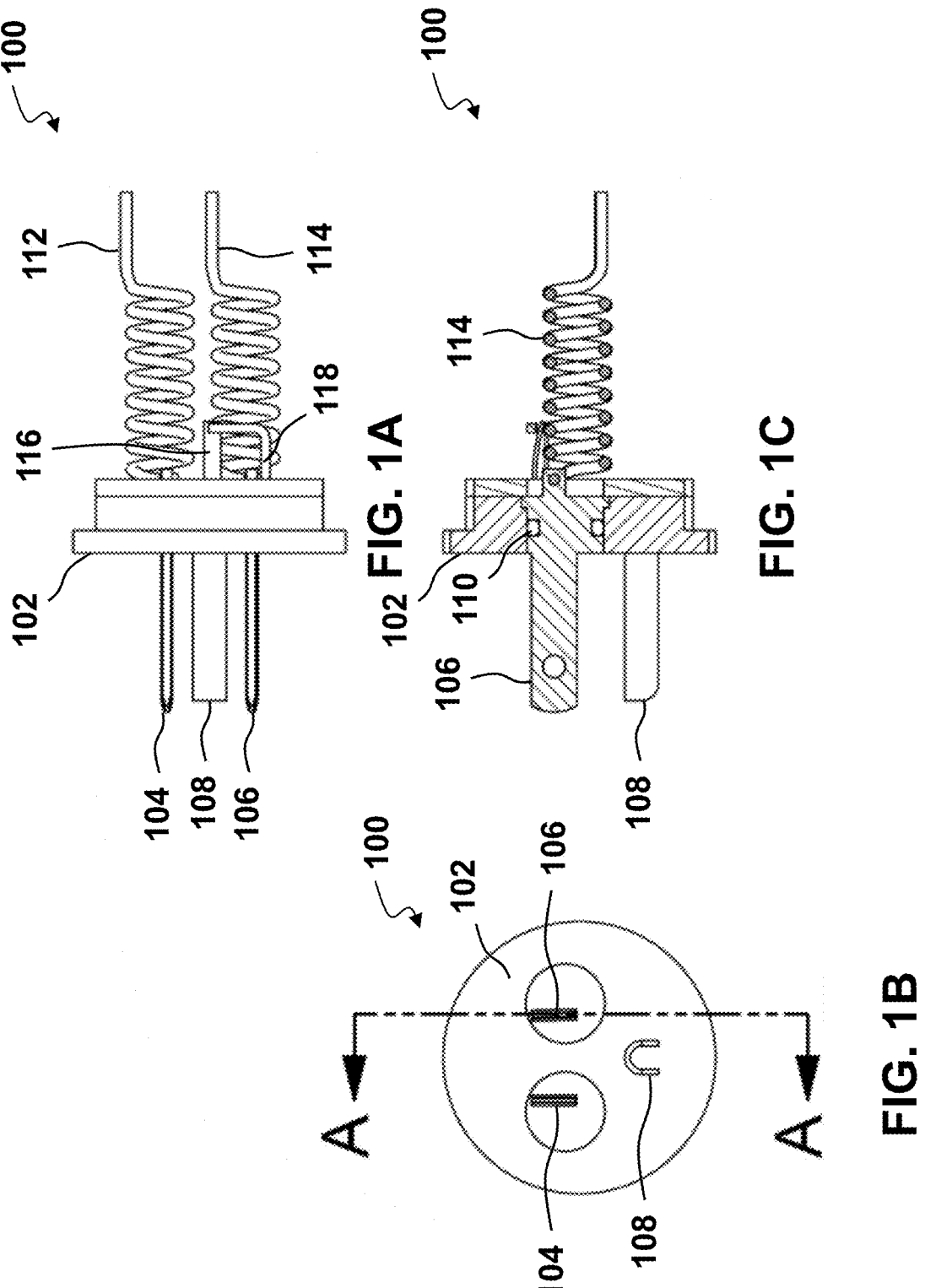
FIG. 1A depicts a top view of a cordset electric vehicle supply equipment (EVSE) having rotatable plug blades and a housing removed, according to one embodiment.
FIG. 1B depicts a front view of the cordset EVSE of FIG. 1A, according to one embodiment.
FIG. 1C depicts a cross sectional side view of the cordset EVSE of FIG. 1A about line A-A, according to one embodiment.

FIG. 1A depicts a top view of a cordset electric vehicle supply equipment (EVSE) 100 having rotatable plug blades and a housing removed, according to one embodiment. The cordset 100 includes a first rotatable blade 104, a second rotatable blade 106, and a fixed ground prong 108. The first rotatable blade 104, second rotatable blade 106, and fixed ground prong 108 may be disposed proximate a front portion 102 of the cordset 100. The first rotatable blade 104 may be connected to a first wire 112. In some embodiments, the first wire 112 may be a coiled wire. In other embodiment, the first wire 112 may be any flexible conductor such as a copper braid, a sliding contact, or the like. The second rotatable blade 106 may be connected to a second wire 114. In some embodiments, the second wire 114 may be a coiled wire. In other embodiment, the second wire 114 may be any flexible conductor such as a copper braid, a sliding contact, or the like. While coiled wires are shown, other wires that provide slack for rotation of the respective blades 104, 106 are possible and contemplated. In one embodiment, the wires may have a helix shape, a spiral shape, and/or be a braided cable having a high amount of flexibility. An auxiliary contact 118 may be connected to the second rotatable blade 106. The auxiliary contact 118 may contact a set of contacts 116 to close the set of contacts 116 to provide an indication of a rotational position of the second rotatable blade 106. The set of contacts 116 may be attached to a portion of the cordset 100.

FIG. 1B depicts a front view of the cordset EVSE 100 of FIG. 1A, according to one embodiment. The first rotatable blade 104 is shown in a first vertical first blade position. The second rotatable blade 106 is shown in a first vertical second blade position. The fixed ground prong 108 is fixed in position and does not rotate.

FIG. 1C depicts a cross sectional side view of the cordset EVSE 100 of FIG. 1A about line A-A, according to one embodiment. The second rotatable blade 106 comprises a second seal 110 disposed between the second rotatable blade 106 and the front portion 102 of the cordset 100. The second seal 110 may be an o-ring seal in some embodiments. The second seal 110 may provide sufficient friction to maintain a position of the second rotatable blade 106 after rotation of the second rotatable blade 106. In some embodiments, the front portion 102 of the cordset 100 may include one or more detents to hold the second rotatable blade 106 in a desired orientation such as the first vertical second blade position and a second horizontal second blade position. The first vertical second blade position may be perpendicular to the second horizontal second blade position.

FIG. 2 depicts a front perspective view of a cordset EVSE 200 with a housing 202, according to one embodiment. The cordset 200 includes a front portion 102 and a housing 202 attached to the front portion 102. The housing 202 may conceal the wires within the cordset 200.

Figure 3A:
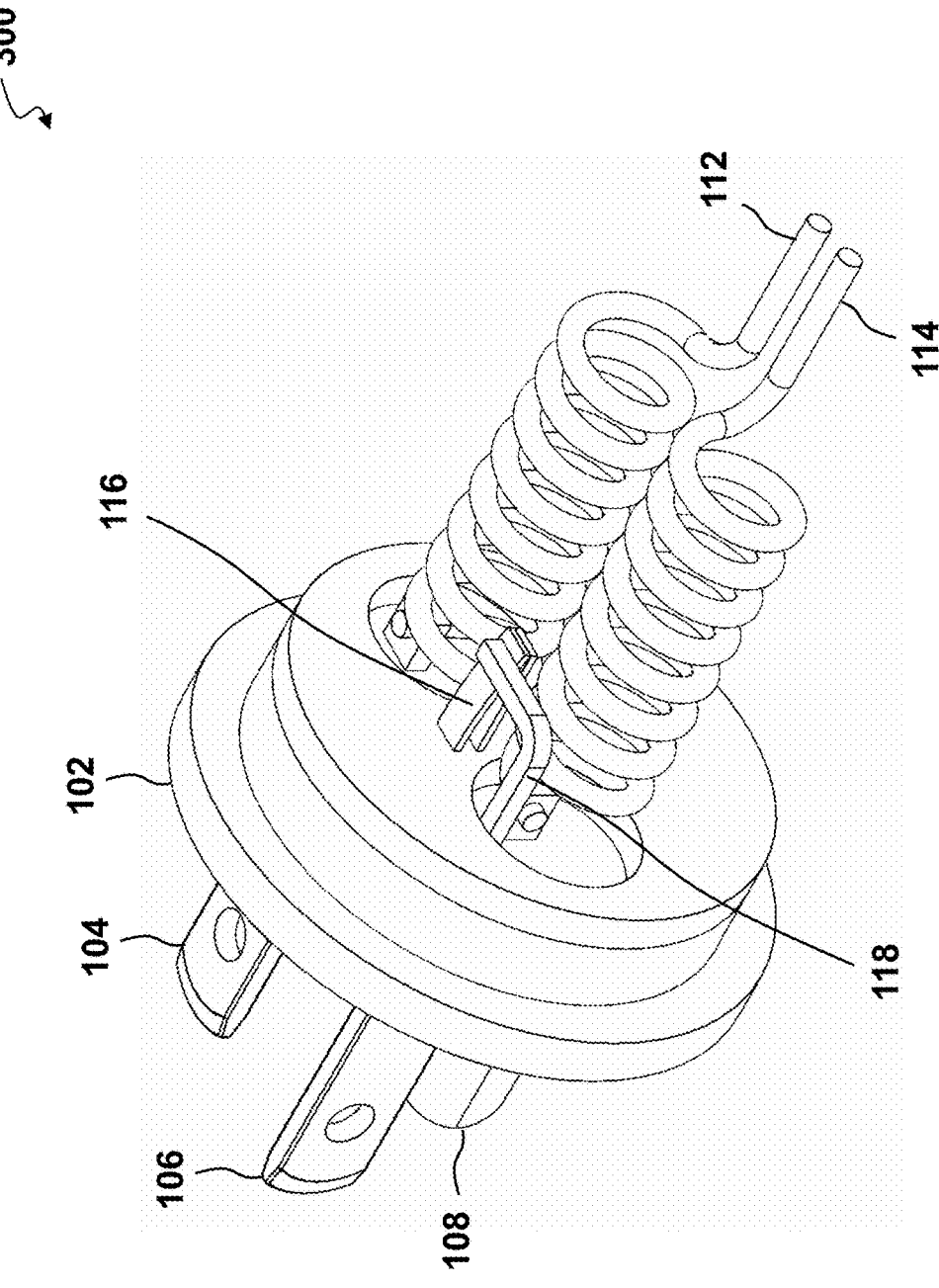
FIG. 3A depicts a rear perspective view of the cordset EVSE of FIG. 2 with the housing removed, according to one embodiment.

FIG. 3A depicts a rear perspective view of the cordset EVSE 300 of FIG. 2 with the housing removed, according to one embodiment. The first rotatable blade 104 is shown in a second horizontal first blade position. The second rotatable blade 106 is shown in a first vertical second blade position. The auxiliary contact 118 connected to the second rotatable blade 106 has been rotated such that it touches a top contact of the set of contacts 116 and forces the set of contacts closed. While an auxiliary contact 118 and set of contacts 116 is shown, other rotational detection sensors are possible and contemplated. In one embodiment, a hall effect sensor and magnet may be used to detect a rotational position of a plug blade. In another embodiment, an optical sensor with a shutter that goes between an emitter and receiver pair may be used to detect a rotational position of a plug blade. In another embodiment, an inductive sensor that senses the presence or absence of a ferromagnetic tab may be used to detect a rotational position of a plug blade.

Figure 3B:
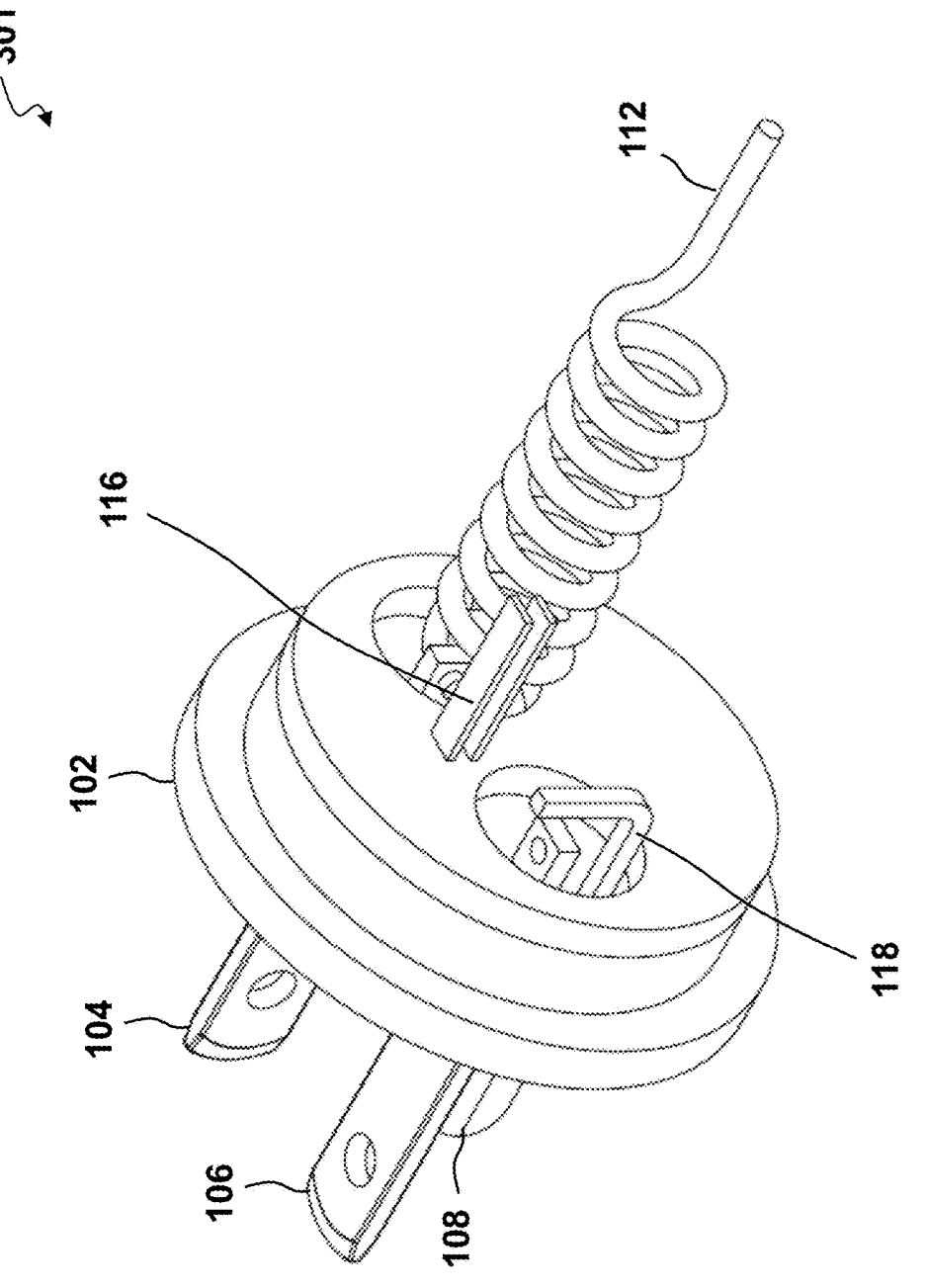
FIG. 3B depict a rear perspective view of the cordset EVSE of FIG. 3A with the housing and a second wire removed and with a second rotatable blade rotated to a horizontal position from a vertical position, according to one embodiment.

FIG. 3B depicts a rear perspective view of the cordset EVSE 301 of FIG. 3A with the housing and a second wire removed and with a second rotatable blade 106 rotated to a horizontal position from a vertical position, according to one embodiment. When the second rotatable blade 106 is rotated to a first vertical second blade position, the auxiliary contact 118 is no longer touching the top contact of the set of contacts 116. In this position, the set of contacts 116 is not touching and the rotational position of the second rotatable blade 106 can be determined.

In a 120V plug, the first rotatable blade 104 may be connected to hot and the second rotatable blade 106 may be connected to neutral. In a 240V plug, the first rotatable blade 104 may be connected to hot and the second rotatable blade 106 may be connected to hot.

FIG. 4A depicts top and front views of the cordset EVSE in a NEMA 5-15 configuration 400, according to one embodiment. In the NEMA 5-15 configuration 400, the first rotatable blade is in a first vertical first blade position and the second rotatable blade is in a first vertical second blade position. In the NEMA 5-15 configuration 400, charging is provided at 15 Amps 120 Volts.

FIG. 4B depicts top and front views of the cordset EVSE in a NEMA 5-20 configuration 402, according to one embodiment. In the NEMA 5-20 configuration 402, the first rotatable blade is in a first vertical first blade position and the second rotatable blade is in a second horizontal second blade position. In the NEMA 5-20 configuration 402, charging is provided at 20 Amps 120 Volts.

FIG. 4C depicts top and front views of the cordset EVSE in a NEMA 6-15 configuration 404, according to one embodiment. In the NEMA 6-15 configuration 404, the first rotatable blade is in a second horizontal first blade position and the second rotatable blade is in a second horizontal second blade position. In the NEMA 6-15 configuration 404, charging is provided at 15 Amps 240 Volts.

FIG. 4D depicts top and front views of the cordset EVSE in a NEMA 6-20 configuration 406, according to one embodiment. In the NEMA 6-20 configuration 406, the first rotatable blade is in a second horizontal first blade position and the second rotatable blade is in a first vertical second blade position. In the NEMA 6-20 configuration 406, charging is provided at 20 Amps 240 Volts.

The NEMA 5-15 configuration 400 can be changed to the NEMA 5-20 configuration 402 by rotating the second rotatable blade to a second horizontal second blade position. In some embodiments, the second rotatable blade may be rotatable and the first blade may be fixed to allow for a change between a NEMA 5-15 configuration 400 and a NEMA 5-20 configuration 402. The NEMA 5-15 configuration 400 can be changed to the NEMA 6-20 configuration 406 by rotating the first rotatable blade to a second horizontal first blade position. In some embodiments, the first rotatable blade may be rotatable and the second blade may be fixed to allow for a change between a NEMA 5-15 configuration 400 and a NEMA 6-20 configuration 406.

FIG. 5A depicts an exemplary system for a cordset EVSE 500 having two rotatable plug blades with an auxiliary contact to detect rotation of a second plug blade, according to one embodiment. The EVSE 500 may include a housing 202, a first rotatable blade 104, a first seal 512 disposed between the first rotatable blade 104 and the housing 202, and a first wire 112 connected to the first rotatable blade. The EVSE 500 may also include a second rotatable blade 106, a second seal 110 disposed between the second rotatable blade 106 and the housing 202, and a second wire 114. The EVSE 500 may also include an auxiliary contact 118 attached to the second rotatable blade 106 such that the auxiliary contact 118 rotates with the second rotatable blade 106. When the auxiliary contact 118 contacts a top contact of the set of contacts 116, the set of contacts 116 are forced closed. An electronics 510 may be in communication with the set of contacts 116 to detect when the set of contacts 116 are closed or open. A ground prong 108 may be fixed in position. A cable 508 may be connected to the housing 202 to provide power from the first rotatable blade 104 and second rotatable blade 106.

Figure 5B:
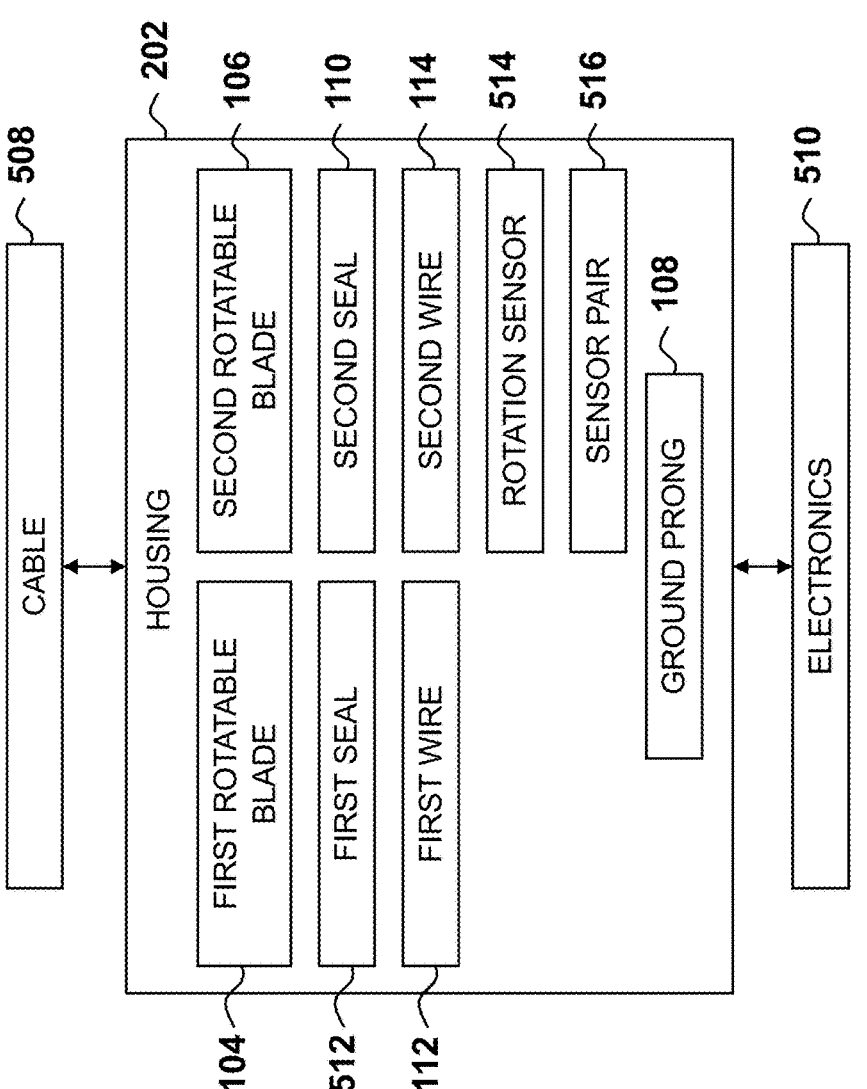
FIG. 5B depicts an exemplary system for a cordset EVSE having two rotatable plug blades with a rotation sensor to detect rotation of a second plug blade, according to one embodiment.

FIG. 5B depicts an exemplary system for a cordset EVSE 502 having two rotatable plug blades with a rotation sensor to detect rotation of a second plug blade, according to one embodiment. The EVSE 502 may include a housing 202, a first rotatable blade 104, a first seal 512 disposed between the first rotatable blade 104 and the housing 202, and a first wire 112 connected to the first rotatable blade 104. The EVSE 500 may also include a second rotatable blade 106, a second seal 110 disposed between the second rotatable blade 106 and the housing 202, and a second wire 114. The EVSE 500 may also include a rotation sensor 514 attached to the second rotatable blade 106. When the second rotatable blade 106 rotates it may detect a sensor pair 516 disposed on the housing. An electronics 510 may be in communication with the rotation sensor 514 to detect a position of the second rotatable blade 106. The rotation sensor 514 and sensor pair 516 may include: a Hall effect sensor to sense a presence of a magnet as the second rotatable blade 106 is rotated, an optical sensor with a shutter that goes between an emitter and receiver pair, and/or an inductive sensor that senses a presence or an absence of a ferromagnetic tab. A ground prong 108 may be fixed in position. A cable 508 may be connected to the housing 202 to provide power from the first rotatable blade 104 and second rotatable blade 106.

FIG. 5C depicts an exemplary system for a cordset EVSE 504 having a fixed hot plug blade and a rotatable neutral plug blade, according to one embodiment. The EVSE 504 may include a housing 202, a first fixed blade 518, and a first wire 520 connected to the first fixed blade 518. The EVSE 500 may also include a second rotatable blade 106, a second seal 110 disposed between the second rotatable blade 106 and the housing 202, and a second wire 114. The EVSE 500 may also include a rotation detection 522 to detect a rotational position of the second rotatable blade 106. An electronics 510 may be in communication with the rotation detection 522 to detect a position of the second rotatable blade 106. A ground prong 108 may be fixed in position. A cable 508 may be connected to the housing 202 to provide power from the first blade 518 and second rotatable blade 106.

FIG. 5D depicts an exemplary system for a cordset EVSE 506 having a rotatable plug blade and a fixed plug blade, according to one embodiment. The EVSE 506 may include a housing 202, a first rotatable blade 104, a first seal 512 disposed between the first rotatable blade 104 and the housing 202, and a first wire 112 connected to the first rotatable blade. The EVSE 500 may also include a second fixed blade 524 and a second wire 526. An electronics 510 may determine a voltage between the first rotatable blade 104 and the second fixed blade to detect a position of the first rotatable blade 104. A ground prong 108 may be fixed in position. A cable 508 may be connected to the housing 202 to provide power from the first rotatable blade 104 and second fixed blade 524.

FIG. 6 depicts a flow chart of a method embodiment 600 of assembling a cordset EVSE with rotatable plug blades, according to one embodiment. The method 600 may include connecting a first rotatable blade to a cordset housing, where the first rotatable blade is rotatable between a first vertical first blade position and a second horizontal first blade position, and where a first seal is disposed between the first rotatable blade and the cordset housing (step 602). The method 600 may then include connecting a first wire to the first rotatable blade within the cordset housing (step 604). The method 600 may then include connecting a second rotatable blade to a cordset housing, where the second rotatable blade is rotatable between a first vertical second blade position and a second horizontal second blade position, and where a second seal is disposed between the second rotatable blade and the cordset housing (step 606). The method 600 may then include connecting a second wire to the second rotatable blade within the cordset housing.

Figure 7:
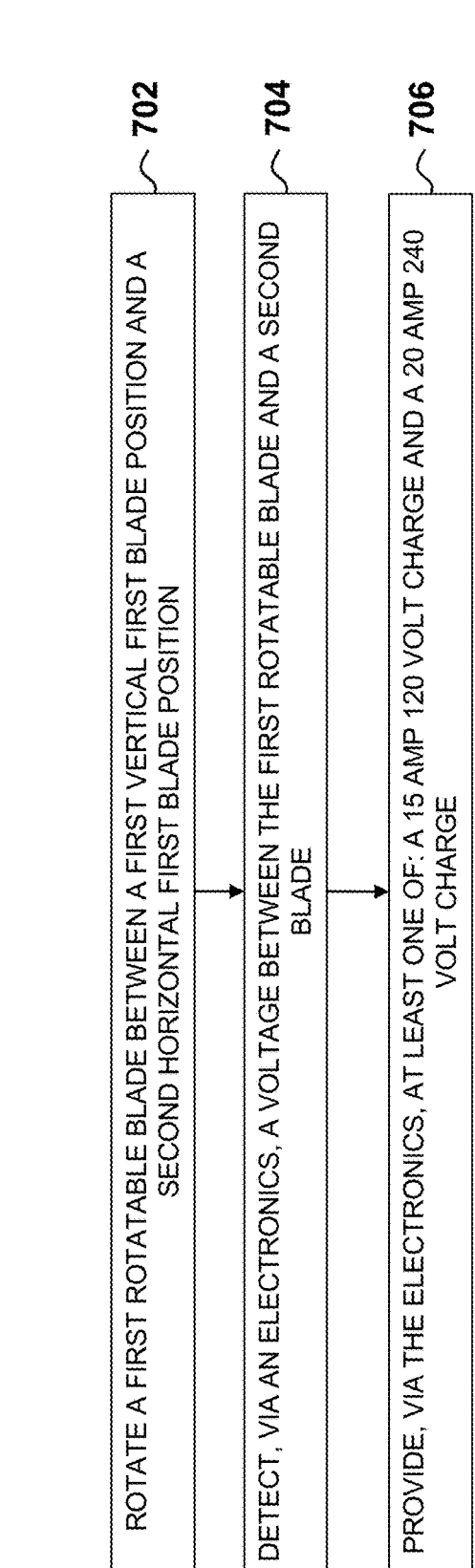
FIG. 7 depicts a flow chart of a method embodiment of rotating a hot plug blade of a cordset EVSE, according to one embodiment.

FIG. 7 depicts a flow chart of a method embodiment 700 of rotating a plug blade of a cordset EVSE, according to one embodiment. The method may include rotating a first rotatable blade between a first vertical first blade position and a second horizontal first blade position (step 702). The method 700 may then include detecting, via an electronics, a voltage between the first rotatable blade and a second blade (step 704). The method 700 may then include providing, via the electronics, at least one of: a 15 amp 120 volt charge and a 20 amp 240 volt charge (step 706).

FIG. 8 depicts a flow chart of a method embodiment 800 of rotating a plug blade of a cordset EVSE, according to one embodiment. The method 800 may include determining a position of a first rotatable blade between a first vertical first blade position and a second horizontal first blade position (step 802). The method 800 may then include rotating a second rotatable blade between a first vertical second blade position and a second horizontal second blade position (step 804). The method 800 may then include detecting a position of the second rotatable blade (step 806). The method 800 may then include detecting whether a set of contacts is closed or open, where the contacts are closed when an auxiliary contact connected to the second rotatable blade contacts the set of contacts in the first vertical second blade position (step 808) and/or determining a position via a sensor connected to the second rotatable blade and a sensor pair connected to a cordset housing (step 810). The method 800 may then include providing, via the electronics, at least one of: a 15 amp 120 volt charge, a 20 amp 120 volt charge, a 15 amp 240 v charge, and a 20 amp 240 volt charge (step 812).

Figure 9:
FIG. 9 depicts an adapter plug configured to receive an alternate cordset electric vehicle supply equipment (EVSE) having a rotatable neutral plug blade, according to one embodiment.

FIG. 9 depicts an adapter plug 900 configured to receive an alternate cordset electric vehicle supply equipment (EVSE) having a rotatable neutral plug blade and/or a neutral plug blade having a forty-five degree angle relative to the hot plug blades. The adapter plug 900 includes a three-prong plug 902 configured to be received by a three-prong receptacle. The three-prong plug 902 includes a hot prong 904, a neutral prong 906, and a ground prong 908. The adapter plug 900 also includes a four-prong receptacle 910 electrically connected to the three-prong plug 902 via a cable 912. The four-prong receptable 910 includes a neutral plug slot 914 that is angled in position relative to a first hot plug slot 916 and a second hot plug slot 918. The first hot plug slot 916 and the second hot plug slot 918 are substantially parallel to one another. The four-prong receptable 910 also has a grounding slot 920.

For the 120 VAC adapter plug 900, there may be a legal (e.g., UL, NEC) requirement that the adapter plug 900 can't be used with any other products. In the disclosed system and method, the angled neutral plug slot 914 acts as an exclusion key to prevent a user from plugging a non-approved device (e.g., a dryer) into a 120 VAC outlet using the adapter. Having the neutral blade 914 at a 45 degree angle relative to the first hot plug slot 916 and the second hot plug slot 918 provides this functionality such that the adapter plug 900 can only be used with a corresponding plug, such as described in FIGS. 10A-10B.

Figure 10A:
FIGS. 10A-10B depict the alternate cordset EVSE having the rotatable neutral plug blade, according to one embodiment.
Figure 10B:

FIGS. 10A-10B depict the alternate cordset EVSE 1000 having the rotatable neutral plug blade 1002. This cordset EVSE 1000 may be used in multiple types of outlets by twisting the neutral plug blade 1002 into different positions.

While three positions are depicted, the disclosed alternate cordset EVSE 1000 may be used with more than three positions of the rotatable neutral plug blade 1002. Additional positions may correspond to additional adapters that may be used with the alternate cordset EVSE 1000. In one embodiment, the alternate cordset EVSE 1000 may have two or more positions for the rotatable neutral plug blade 1002 relative to the hot plug blades 1004, 1006, including but not limited to: a horizontal position, a vertical position, a first angled position, a second angled position, and an n angled position where n is a number greater than two. In an embodiment with two or more angled positions, the cordset EVSE 1000 may be used with multiple adapters while preventing unintentional plugging in of unapproved devices into those adapters. The corset EVSE 1000 may adapt the provided current for charging based on the position of the rotatable neutral plug blade 1002.

In one embodiment, the cordset EVSE 1000 may be plugged into three different outlets depending on the orientation of the neutral blade. In some embodiments, the cordset EVSE 1000 may include markings to indicate to a user the available positions for the neutral plug blade 1002.

Figures 12A, 12B, 12C:
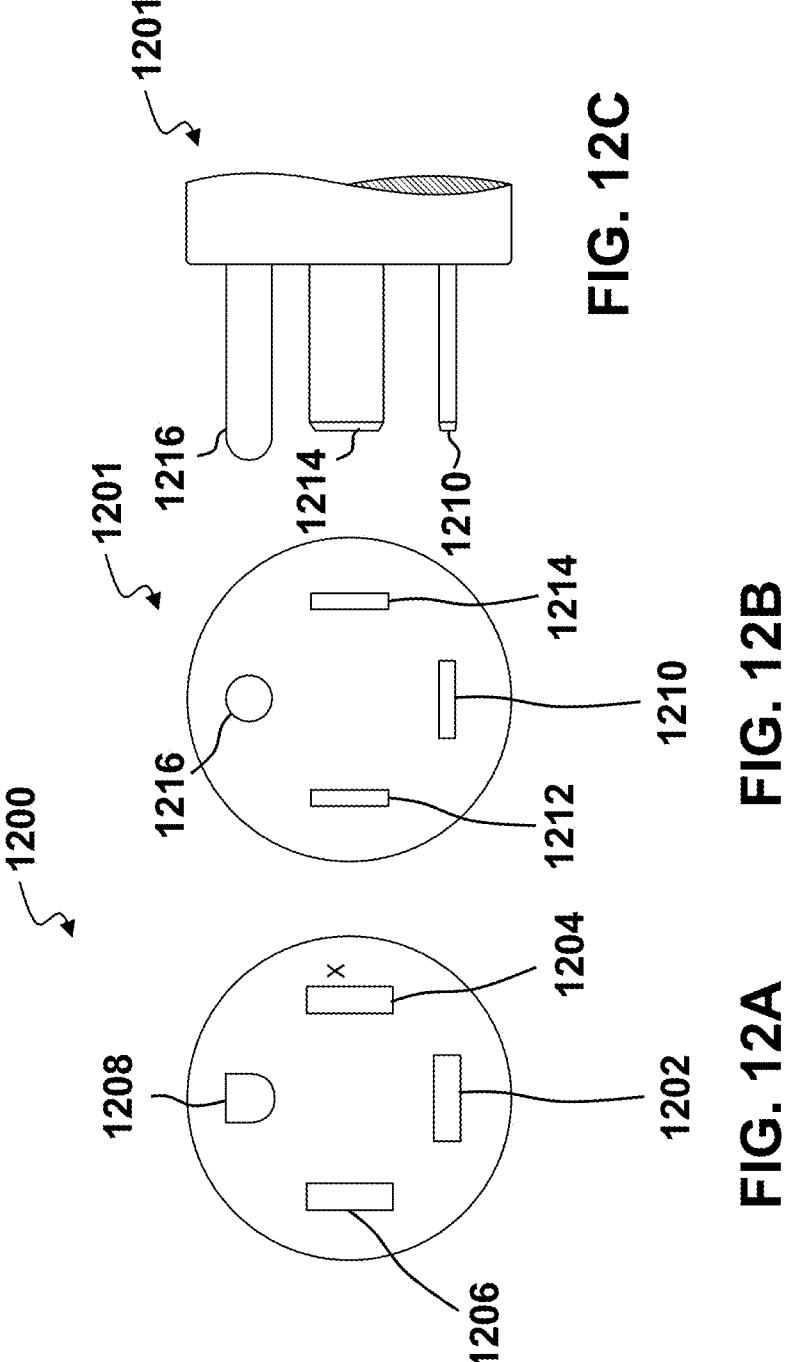
FIG. 12A depicts a front view of a receptacle for receiving a plug having a horizontal neutral plug blade, according to one embodiment.
FIG. 12B depicts a front view of a plug configured to be inserted into the receptacle of FIG. 11A, according to one embodiment.
FIG. 12C depicts a side view of the plug configured to be inserted into the receptacle of FIG. 11A, according to one embodiment.

In a first horizontal position, where the neutral plug blade 1002 is substantially perpendicular to the first hot plug blade 1004 and the second hot plug blade 1006, the cordset EVSE 1000 may be used in NEMA 14-60 outlets. In some embodiments, the NEMA 14-60 outlet may be limited to 48 Amps. Other amperages are possible and contemplated. In the first horizontal position, the cordset EVSE 1000 may be used with a corresponding receptable such as shown in FIG. 12A.

In a second vertical position, where the neutral plug blade 1002 is substantially parallel to the first hot plug blade 1004 and the second hot plug blade 1006, the cordset EVSE 1000 may be used in NEMA 14-50 outlets. In some embodiments, the NEMA 14-50 outlet may be limited to 40 Amps. Other amperages are possible and contemplated. In the second vertical position, the cordset EVSE 1000 may be used with a corresponding receptable such as shown in FIG. 11A.

In a third angled position, where the neutral plug blade 1002 is at a forty-five degree angle relative to the first hot plug blade 1004 and the second hot plug blade 1006, the cordset EVSE 1000 may be used with a 120 VAC low power (LP) adapter for emergency charging, such as the adapter plug (900, FIG. 9). In the third angled position, the current may be restricted to a safe value. In some embodiments, the adapter plug (900, FIG. 9) may be limited to 10 Amps. Other amperages are possible and contemplated.

The first horizontal position, the second vertical position, and the third angled position cover the most common outlet types used in North America.

Figures 11A, 11B, 11C:
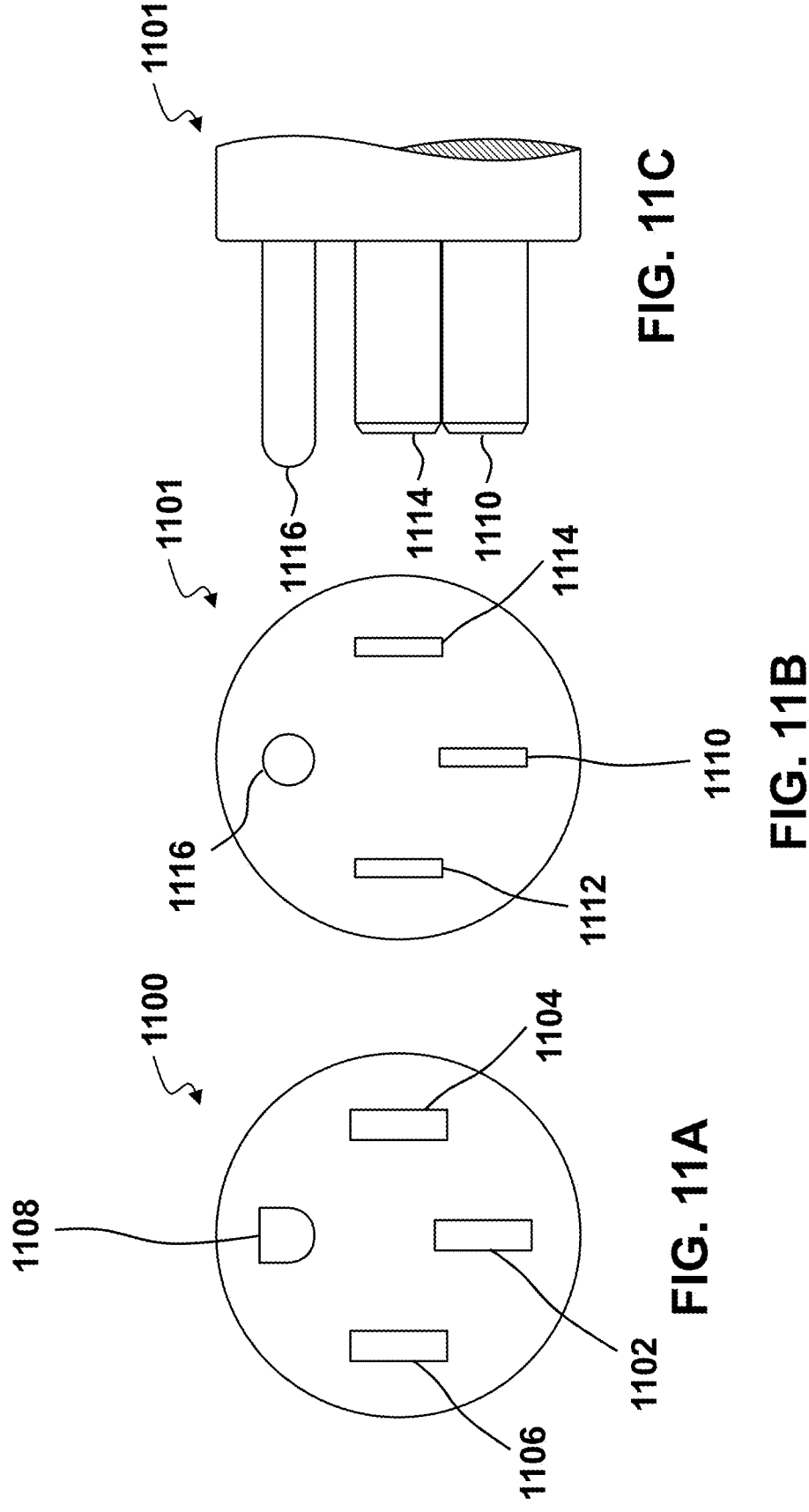
FIG. 11A depicts a front view of a receptacle for receiving a plug having a vertical neutral plug blade, according to one embodiment.
FIG. 11B depicts a front view of a plug configured to be inserted into the receptacle of FIG. 11A, according to one embodiment.
FIG. 11C depicts a side view of the plug configured to be inserted into the receptacle of FIG. 11A, according to one embodiment.

FIG. 11A depicts a front view of a receptacle 1100 for receiving a plug having a vertical neutral plug blade. The receptacle 1100 may have a neutral plug slot 1102 that is vertical in position. The receptable 1100 may have a first hot plug slot 1104 and a second hot plug slot 1106 that are substantially parallel to one another and to the neutral plug slot 1102. The receptacle 1100 may also have a grounding slot 1108.

FIG. 11B depicts a front view of a plug 1101 configured to be inserted into the receptacle of FIG. 11A. The plug 1101 may have a neutral plug blade 1110 that is vertical in position. The plug 1101 may have a first hot plug blade 1112 and a second hot plug blade 1114 that are substantially parallel to one another and parallel to the neutral plug blade 1110. The receptacle 1101 may also have a grounding plug blade 1116.

FIG. 11C depicts a side view of the plug 1101 configured to be inserted into the receptacle of FIG. 11A. The length of the grounding plug blade 1116 may be longer than the length of the first hot plug blade, second hot plug blade 1114, and neutral plug blade 1110. The grounding plug blade 1116 may be u-shaped or tubular. In some embodiments, the receptacle (1100, FIG. 11A) and plug 1101 may be 120/250 volts, 50 amperes, 3 pole, 4 wire, grounding type.

FIG. 12A depicts a front view of a receptacle 1200 for receiving a plug having a horizontal neutral plug blade. The receptacle 1200 may have a neutral plug slot 1202 that is horizontal in position. The receptable 1200 may have a first hot plug slot 1204 and a second hot plug slot 1206 that are substantially parallel to one another and perpendicular to the neutral plug slot 1202. The receptacle 1200 may also have a grounding slot 1208.

FIG. 12B depicts a front view of a plug 1201 configured to be inserted into the receptacle of FIG. 12A. The plug 1201 may have a neutral plug blade 1210 that is horizontal in position. The plug 1201 may have a first hot plug blade 1212 and a second hot plug blade 1214 that are substantially parallel to one another and perpendicular to the neutral plug blade 1210. The receptacle 1200 may also have a grounding plug blade 1216.

FIG. 12C depicts a side view of the plug configured to be inserted into the receptacle of FIG. 12A. The length of the grounding plug blade 1216 may be longer than the length of the first hot plug blade, second hot plug blade 1214, and neutral plug blade 1210. The grounding plug blade 1216 may be u-shaped or tubular. In some embodiments, the receptacle (1200, FIG. 12A) and plug 1201 may be 120/250 volts, 60 amperes, 3 pole, 4 wire, grounding type.

Figure 13:
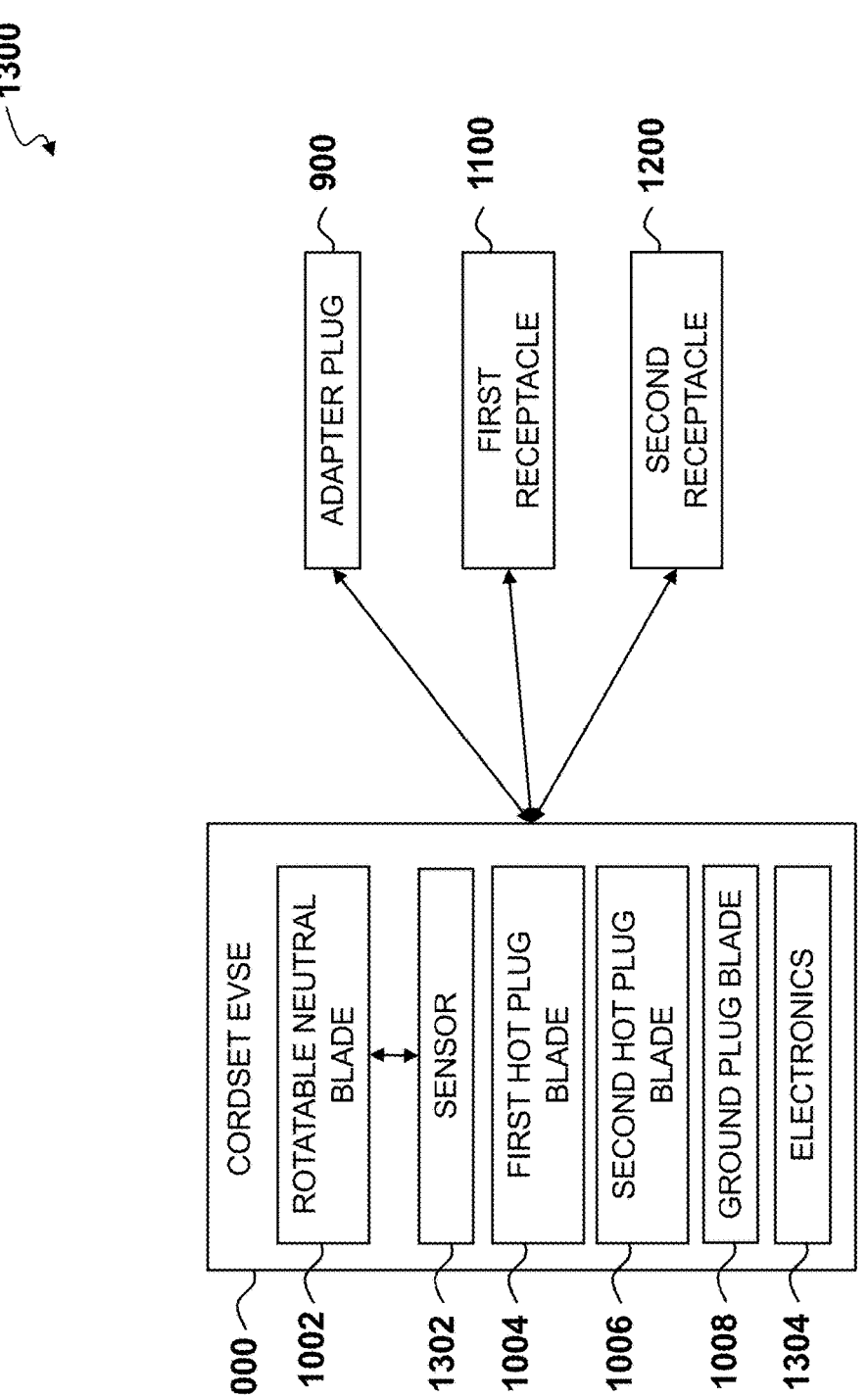
FIG. 13 depicts an exemplary system for a cordset EVSE having a rotatable neutral plug blade, according to one embodiment.

FIG. 13 depicts an exemplary system 1300 for a cordset EVSE 1000 having a rotatable neutral plug blade 1002. The cordset EVSE 1300 may include a rotatable neutral blade 1002 in communication with a sensor 1302, a first hot plug blade 1004, a second hot plug blade 1006, a ground plug blade 1008, and electronics 1304.

The angle of the rotatable neutral blade 1002 may be sensed by the sensor 1302. In some embodiments, the sensor 1302 may be a charge circuit interrupting device (CCID). The CCID may set a max charge current such that a rating of the outlet is not exceeded. In some embodiments, the sensor 1302 may be in communication with and/or a part of the electronics 1304. In some embodiments, the position of the rotatable neutral blade 1002 may be sensed by a magnet and a corresponding magnetic sensor, which may be located on a printed circuit board (PCB) and may include additional electronics 1304. Other embodiments may use a potentiometer, switches, encoders, and the like to sense the position of the rotatable neutral blade 1002.

The disclosed cordset EVSE 1000 may have a lower cost, smaller size, reduced complexity, and increased performance due to reduced losses at high charging rates as compared to other options for charging.

FIG. 14 depicts a flow chart of a method embodiment 1400 of rotating a neutral plug blade of a cordset EVSE. The method 1400 may include rotating a rotatable neutral blade to a position of at least one of: a first horizontal position, a second vertical position, and a third angled position (step 1402). The method 1400 may then include: detecting, via a sensor, the rotated position of the rotatable neutral blade (step 1404). The method 1400 may then include: providing, via an electronics, at least one of: a 48 amp charge, a 40 amp charge, and a 10 amp charge based on the detected rotated position of the rotatable neutral blade (step 1406).

Figure 15:
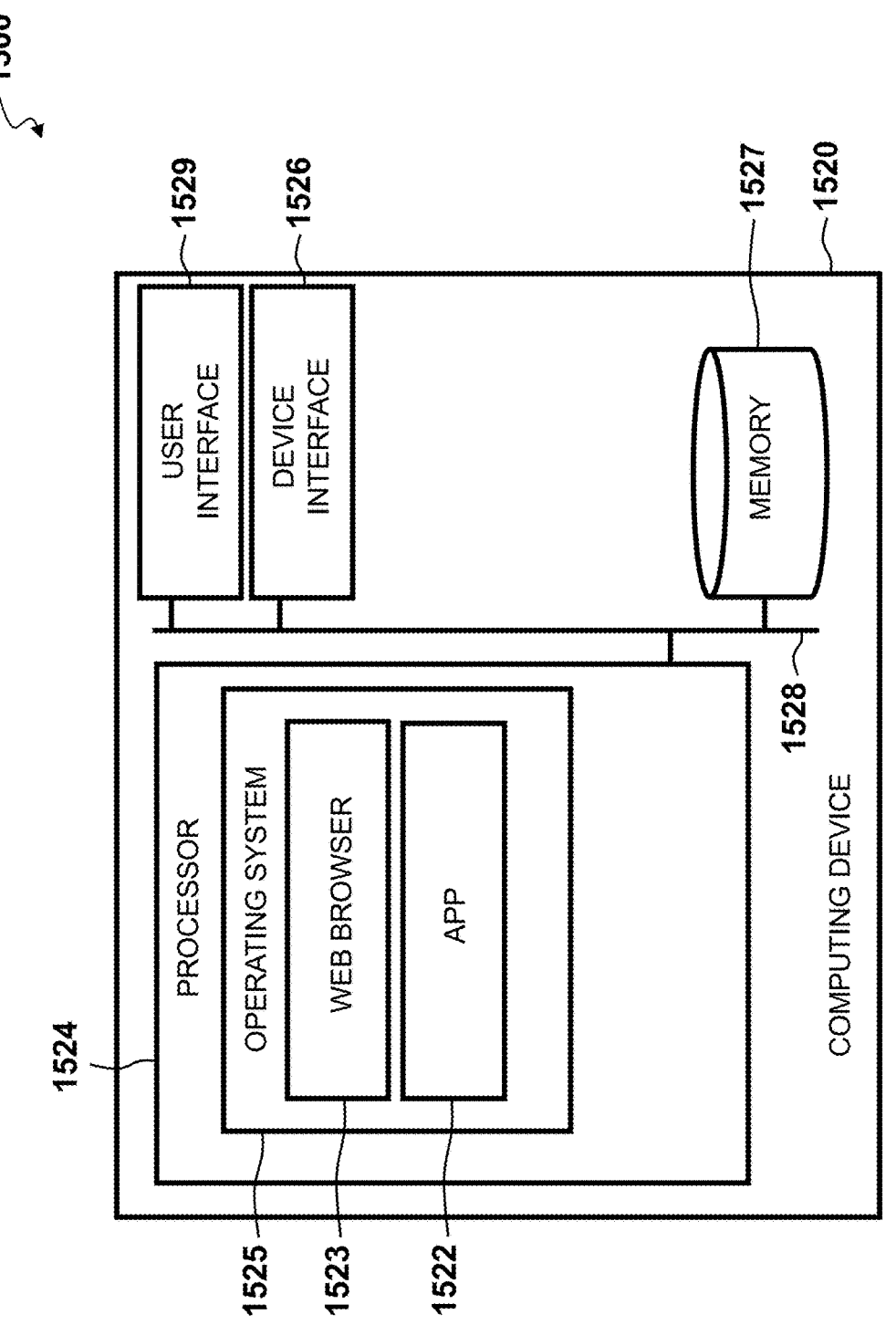
FIG. 15 illustrates an example top-level functional block diagram of a computing device embodiment, according to one embodiment.

FIG. 15 illustrates an example of a top-level functional block diagram of a computing device embodiment 1500. The example operating environment is shown as a computing device 1520 comprising a processor 1524, such as a central processing unit (CPU), addressable memory 1527, an external device interface 1526, e.g., an optional universal serial bus port and related processing, and/or an Ethernet port and related processing, and an optional user interface 1529, e.g., an array of status lights and one or more toggle switches, and/or a display, and/or a keyboard and/or a pointer-mouse system and/or a touch screen. Optionally, the addressable memory may, for example, be flash memory, eprom, and/or a disk drive or other hard drive. These elements may be in communication with one another via a data bus 1528. In some embodiments, via an operating system 1525 such as one supporting a web browser 1523 and applications 1522, the processor 1524 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

Figure 16:
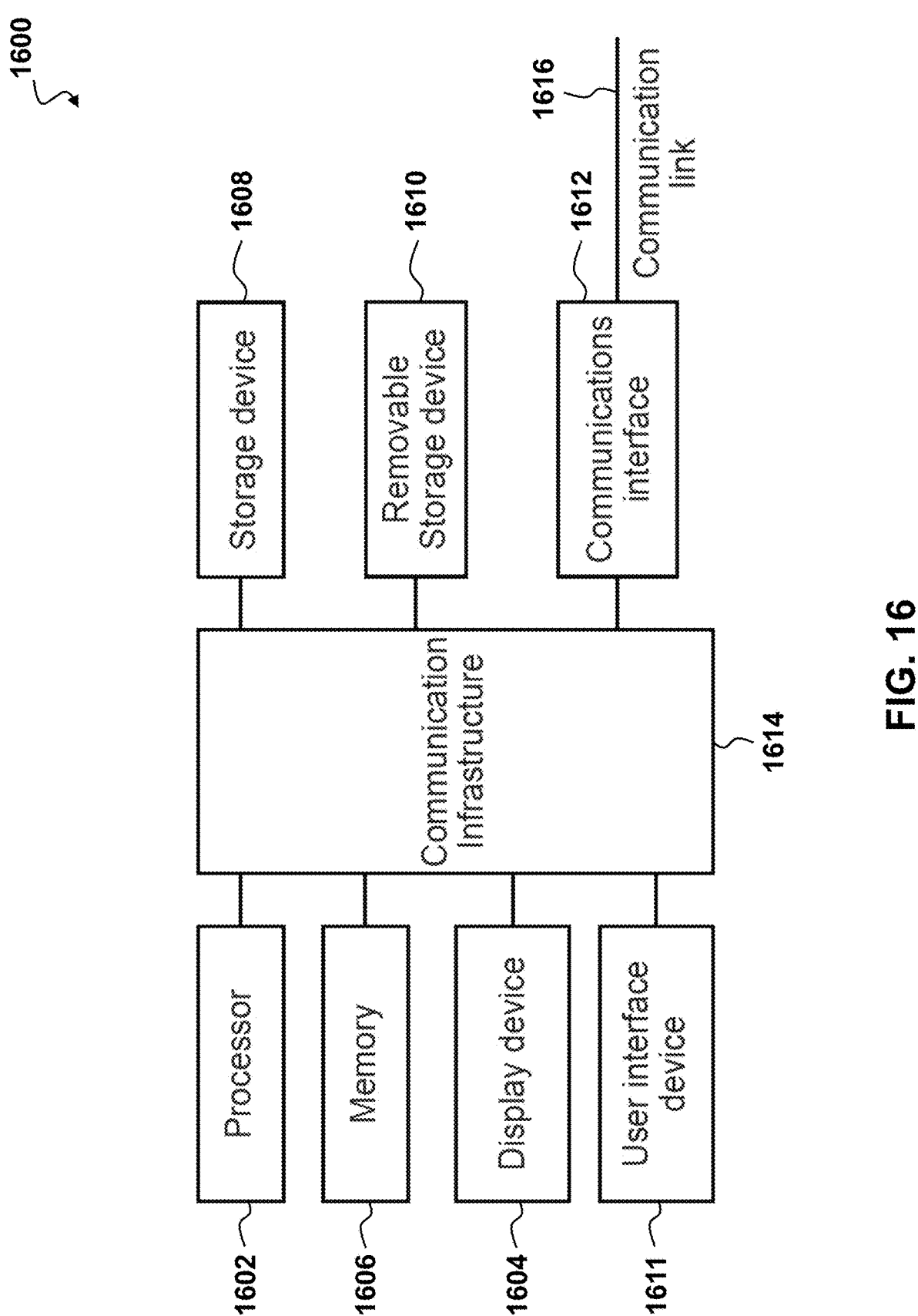
FIG. 16 shows a high-level block diagram and process of a computing system for implementing an embodiment of the system and process, according to one embodiment.

FIG. 16 is a high-level block diagram 1600 showing a computing system comprising a computer system useful for implementing an embodiment of the system and process, disclosed herein. Embodiments of the system may be implemented in different computing environments. The computer system includes one or more processors 1602, and can further include an electronic display device 1604 (e.g., for displaying graphics, text, and other data), a main memory 1606 (e.g., random access memory (RAM)), storage device 1608, a removable storage device 1610 (e.g., removable storage drive, a removable memory module, a magnetic tape drive, an optical disk drive, a computer readable medium having stored therein computer software and/or data), user interface device 1611 (e.g., keyboard, touch screen, keypad, pointing device), and a communication interface 1612 (e.g., modem, a network interface (such as an Ethernet card), a communications port, or a PCMCIA slot and card). The communication interface 1612 allows software and data to be transferred between the computer system and external devices. The system further includes a communications infrastructure 1614 (e.g., a communications bus, cross-over bar, or network) to which the aforementioned devices/modules are connected as shown.

Information transferred via communications interface 1612 may be in the form of signals such as electronic, electromagnetic, optical, or other signals capable of being received by communications interface 1612, via a communication link 1616 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1612. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 17:
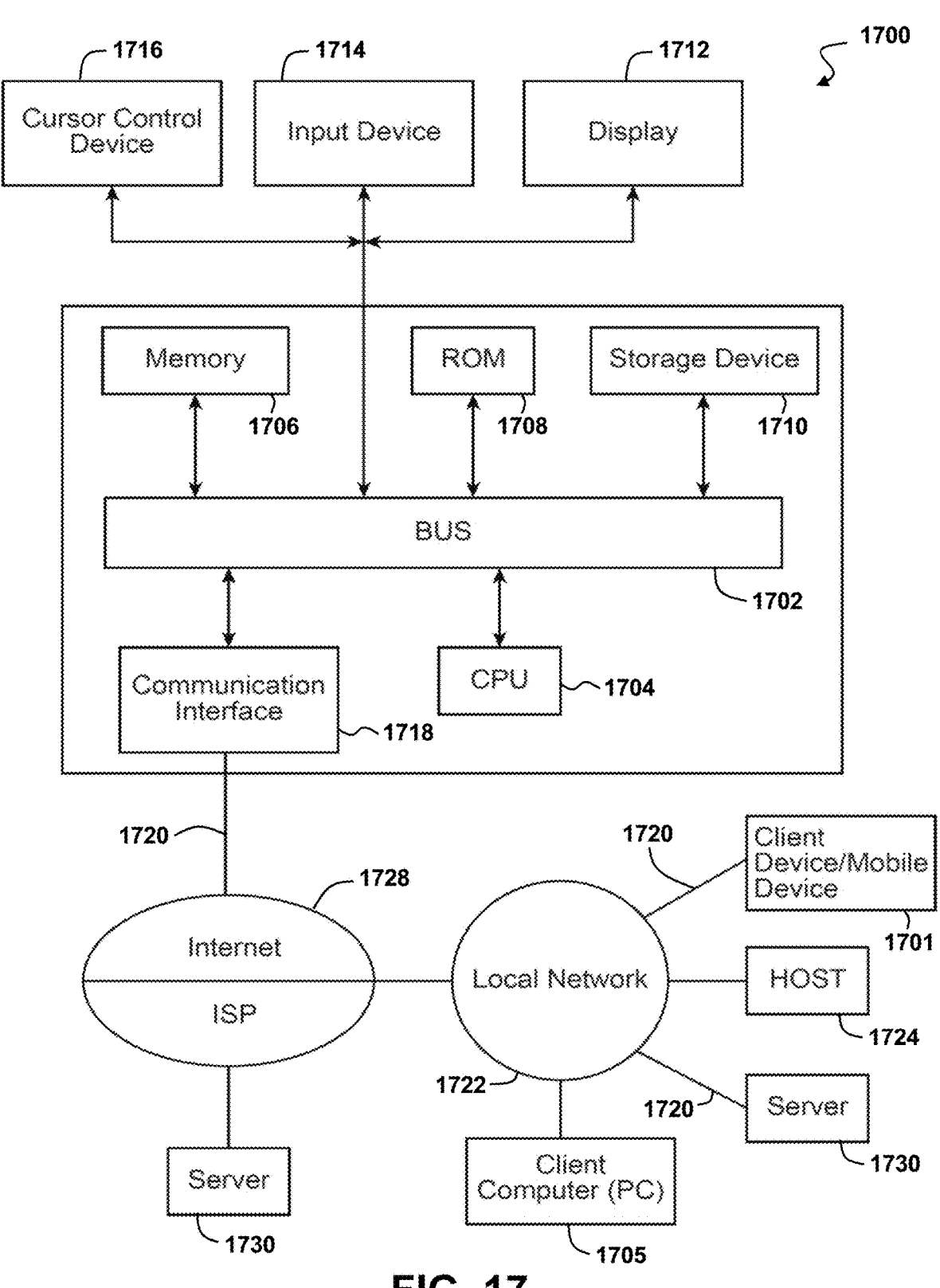
FIG. 17 shows a block diagram and process of an exemplary system in which an embodiment may be implemented, according to one embodiment.

FIG. 17 shows a block diagram of an example system 1700 in which an embodiment may be implemented. The system 1700 includes one or more client devices 1701 such as consumer electronics devices, connected to one or more server computing systems 1730. A server 1730 includes a bus 1702 or other communication mechanism for communicating information, and a processor (CPU) 1704 coupled with the bus 1702 for processing information. The server 1730 also includes a main memory 1706, such as a random access memory (RAM) or other dynamic storage device, coupled to the bus 1702 for storing information and instructions to be executed by the processor 1704. The main memory 1706 also may be used for storing temporary variables or other intermediate information during execution or instructions to be executed by the processor 1704. The server computer system 1730 further includes a read only memory (ROM) 1708 or other static storage device coupled to the bus 1702 for storing static information and instructions for the processor 1704. A storage device 1710, such as a magnetic disk or optical disk, is provided and coupled to the bus 1702 for storing information and instructions. The bus 1702 may contain, for example, thirty-two address lines for addressing video memory or main memory 1706. The bus 1702 can also include, for example, a 32-bit data bus for transferring data between and among the components, such as the CPU 1704, the main memory 1706, video memory and the storage 1710. Alternatively, multiplex data/address lines may be used instead of separate data and address lines.

The server 1730 may be coupled via the bus 1702 to a display 1712 for displaying information to a computer user. An input device 1714, including alphanumeric and other keys, is coupled to the bus 1702 for communicating information and command selections to the processor 1704. Another type or user input device comprises cursor control 1716, such as a mouse, a trackball, or cursor direction keys for communicating direction information and command selections to the processor 1704 and for controlling cursor movement on the display 1712.

According to one embodiment, the functions are performed by the processor 1704 executing one or more sequences of one or more instructions contained in the main memory 1706. Such instructions may be read into the main memory 1706 from another computer-readable medium, such as the storage device 1710. Execution of the sequences of instructions contained in the main memory 1706 causes the processor 1704 to perform the process steps described herein. One or more processors in a multi-processing arrangement may also be employed to execute the sequences of instructions contained in the main memory 1706. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor which may be a multi-core processor to perform the features of the computer system. Accordingly, such computer programs represent controllers of the computer system.

Generally, the term "computer-readable medium" as used herein refers to any medium that participated in providing instructions to the processor 1704 for execution. Such a medium may take many forms, including but not limited to, non-volatile media, volatile media, and transmission media. Non-volatile media includes, for example, optical or magnetic disks, such as the storage device 1710. Volatile media includes dynamic memory, such as the main memory 1706. Transmission media includes coaxial cables, copper wire and fiber optics, including the wires that comprise the bus 1702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1704 for execution. For example, the instructions may initially be carried on a magnetic disk of a remote computer. The remote computer can load the instructions into its dynamic memory and send the instructions over a telephone line using a modem. A modem local to the server 1730 can receive the data on the telephone line and use an infrared transmitter to convert the data to an infrared signal. An infrared detector coupled to the bus 1702 can receive the data carried in the infrared signal and place the data on the bus 1702. The bus 1702 carries the data to the main memory 1706, from which the processor 1704 retrieves and executes the instructions. The instructions received from the main memory 1706 may optionally be stored on the storage device 1710 either before or after execution by the processor 1704.

The server 1730 also includes a communication interface 1718 coupled to the bus 1702. The communication interface 1718 provides a two-way data communication coupling to a network link 1720 that is connected to the worldwide packet data communication network now commonly referred to as the Internet 1728. The Internet 1728 uses electrical, electromagnetic or optical signals that carry digital data streams. The signals through the various networks and the signals on the network link 1720 and through the communication interface 1718, which carry the digital data to and from the server 1730, are exemplary forms or carrier waves transporting the information.

In another embodiment of the server 1730, communication interface 1718 is connected to a network 1722 via a communication link 1720. For example, the communication interface 1718 may be an integrated services digital network (ISDN) card or a modem to provide a data communication connection to a corresponding type of telephone line, which can comprise part of the network link 1720. As another example, the communication interface 1718 may be a local area network (LAN) card to provide a data communication connection to a compatible LAN. Wireless links may also be implemented. In any such implementation, the communication interface 1718 sends and receives electrical, electromagnetic, or optical signals that carry digital data streams representing various types of information.

The network link 1720 typically provides data communication through one or more networks to other data devices. For example, the network link 1720 may provide a connection through the local network 1722 to a host computer 1724 or to data equipment operated by an Internet Service Provider (ISP). The ISP in turn provides data communication services through the Internet 1728. The local network 1722 and the Internet 1728 both use electrical, electromagnetic, or optical signals that carry digital data streams. The signals through the various networks and the signals on the network link 1720 and through the communication interface 1718, which carry the digital data to and from the server 1730, are exemplary forms or carrier waves transporting the information.

The server 1730 can send/receive messages and data, including e-mail, program code, through the network, the network link 1720 and the communication interface 1718. Further, the communication interface 1718 can comprise a USB/Tuner and the network link 1720 may be an antenna or cable for connecting the server 1730 to a cable provider, satellite provider or other terrestrial transmission system for receiving messages, data, and program code from another source.

The example versions of the embodiments described herein may be implemented as logical operations in a distributed processing system such as the system 1700 including the servers 1730. The logical operations of the embodiments may be implemented as a sequence of steps executing in the server 1730, and as interconnected machine modules within the system 1700. The implementation is a matter of choice and can depend on performance of the system 1700 implementing the embodiments. As such, the logical operations constituting said example versions of the embodiments are referred to for e.g., as operations, steps or modules.

Similar to a server 1730 described above, a client device 1701 can include a processor, memory, storage device, display, input device and communication interface (e.g., e-mail interface) for connecting the client device to the Internet 1728, the ISP, or LAN 1722, for communication with the servers 1730.

The system 1700 can further include computers (e.g., personal computers, computing nodes) 1705 operating in the same manner as client devices 1701, where a user can utilize one or more computers 1705 to manage data in the server 1730.

Figure 18:
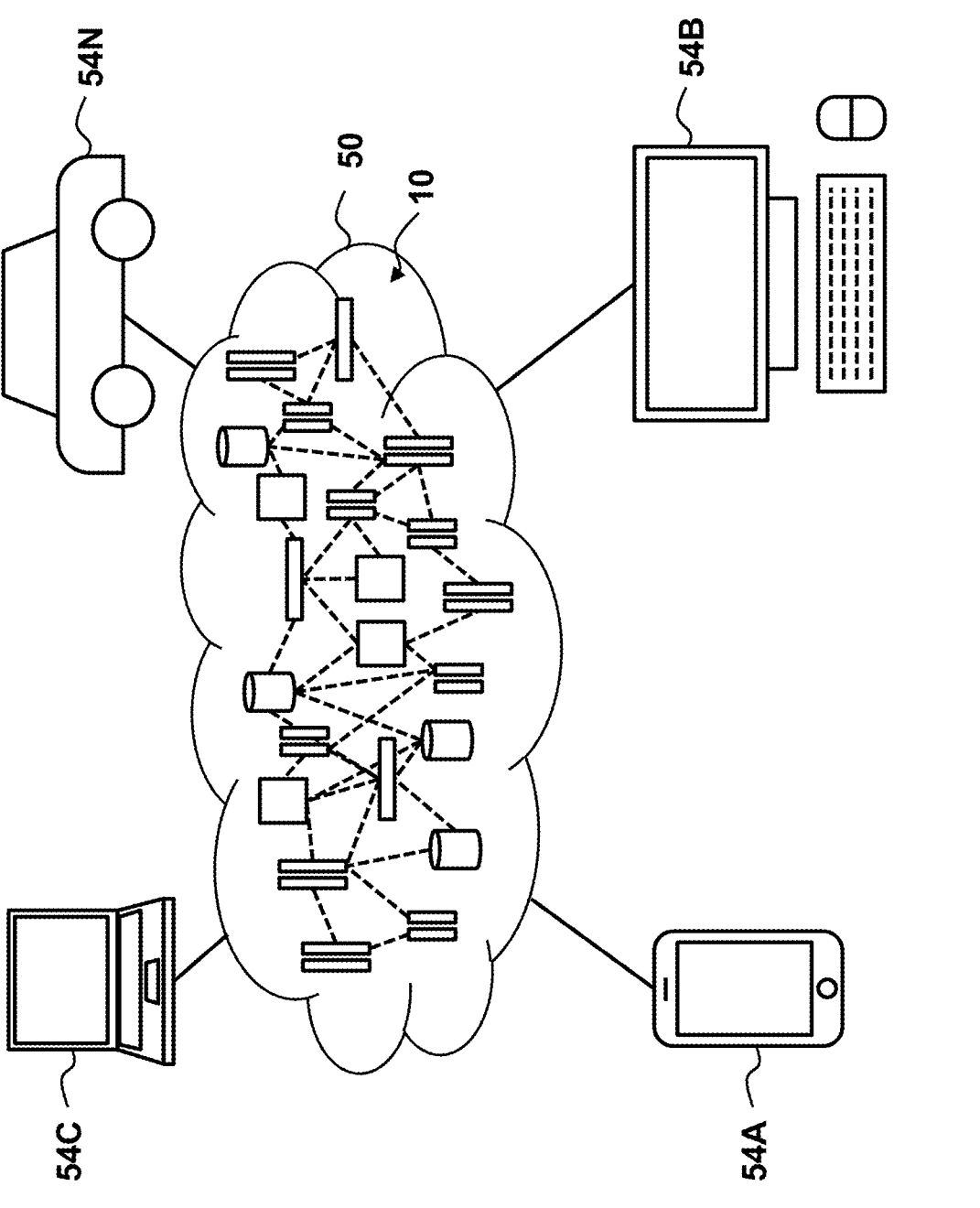
FIG. 18 depicts a cloud-computing environment for implementing an embodiment of the system and process disclosed herein, according to one embodiment.

Referring now to FIG. 18, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or unmanned aerial system (UAS) 54N may communicate. The nodes 10 may communicate with one another. The nodes may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:
a cordset comprising:
a rotatable neutral blade, wherein the rotatable neutral blade is rotatable between a first horizontal position, a second vertical position, and a third angled position;
a first hot plug blade;

a second hot plug blade;
a ground plug blade; and
a sensor configured to sense an angle of the rotatable neutral blade as in at least one of: the first horizontal position, the second vertical position, and the third angled position.

2. The system of claim 1, wherein the sensor is a charge circuit interrupting device (CCID).

3. The system of claim 2, wherein the CCID is configured to set a max charge current such that a rating of an outlet is not exceeded.

4. The system of claim 1, wherein the sensor comprises at least one of: magnets, a potentiometer, switches, and encoders to sense the angle of the rotatable neutral blade.

5. The system of claim 1, wherein when the rotatable neutral blade is in the first horizontal position the rotatable neutral blade is substantially perpendicular to the first hot plug blade and the second hot plug blade.

6. The system of claim 5, wherein when the rotatable neutral blade is in the first horizontal position the cordset is configured to be used in NEMA 14-60 outlets.

7. The system of claim 6, further comprising:
a first receptacle, wherein the first receptacle is a NEMA 14-60 outlet, and wherein the cordset is configured to be used with the first receptacle when the rotatable neutral blade is in the first horizontal position.

8. The system of claim 1, wherein when the rotatable neutral blade is in the second vertical position the rotatable neutral blade is substantially parallel to the first hot plug blade and the second hot plug blade.

9. The system of claim 8, wherein when the rotatable neutral blade is in the second vertical position the cordset is configured to be used in NEMA 14-50 outlets.

10. The system of claim 9, further comprising:
a second receptacle, wherein the second receptacle is a NEMA 14-50 outlet, and wherein the cordset is configured to be used with the second receptacle when the rotatable neutral blade is in in the second vertical position.

11. The system of claim 1, wherein when the rotatable neutral blade is in the third angled position the rotatable neutral blade is at an angle relative to the first hot plug blade and the second hot plug blade.

12. The system of claim 11, wherein when the rotatable neutral blade is in the third angled position the cordset is configured to be used with a low power adapter.

13. The system of claim 1, further comprising:
an adapter plug, wherein the adapter plug is the low power adapter, and wherein the cordset is configured to be used with the adapter plug when the rotatable neutral blade is in in the third angled position.

14. A method, comprising:
rotating a rotatable neutral blade to a position of at least one of: a first horizontal position, a second vertical position, and a third angled position;
detecting, via a sensor, the rotated position of the rotatable neutral blade; and
providing, via an electronics, at least one of: a first amperage charge, a second amperage charge, and a third amperage charge based on the detected rotated position of the rotatable neutral blade.

15. The method of claim 14, wherein the rotatable neutral blade is rotated to the first horizontal position when the electronics provides a charge limited to 48 Amps.

16. The method of claim 14, wherein the rotatable neutral blade is rotated to the second vertical position when the electronics provides a charge limited to 40 Amps.

17. The method of claim 14, wherein the rotatable neutral blade is rotated to the third angled position when the electronics provides a charge limited to 10 Amps.

* * * * *